United States Patent
Perreault et al.

(10) Patent No.: US 10,880,342 B2
(45) Date of Patent: Dec. 29, 2020

(54) DYNAMICALLY CONTROLLING COMMUNICATION CHANNELS DURING A COMMUNICATION SESSION

(71) Applicant: Jive Communications, Inc., Orem, UT (US)

(72) Inventors: Simon Perreault, Québec (CA); Michael Sharp, Pleasant Grove, UT (US)

(73) Assignee: JIVE COMMUNICATIONS, INC., Orem, UT (US)

( * ) Notice: Subject to any disclaimer, the term of this patent is extended or adjusted under 35 U.S.C. 154(b) by 83 days.

(21) Appl. No.: 15/922,140

(22) Filed: Mar. 15, 2018

(65) Prior Publication Data

US 2019/0289042 A1 Sep. 19, 2019

(51) Int. Cl.
*H04L 29/06* (2006.01)
*H04L 29/08* (2006.01)

(52) U.S. Cl.
CPC ...... *H04L 65/1083* (2013.01); *H04L 65/4015* (2013.01); *H04L 65/80* (2013.01); *H04L 67/104* (2013.01); *H04L 67/145* (2013.01); *H04L 67/2871* (2013.01)

(58) Field of Classification Search
USPC ........................................................ 709/227
See application file for complete search history.

(56) References Cited

U.S. PATENT DOCUMENTS 9,332,561 B1 * 5/2016 Khawam ............. H04L 65/1069
2012/0317415 A1 * 12/2012 Li ........................ G06F 21/6263
713/165

FOREIGN PATENT DOCUMENTS

WO WO-2016039985 A1 * 3/2016 ............. H04M 3/42

* cited by examiner

*Primary Examiner* — Glenford J Madamba
(74) *Attorney, Agent, or Firm* — Keller Jolley Preece

(57) ABSTRACT

This disclosure relates to a communication network within which devices participating in a communication session dynamically switch between sending media streams to a participating network device through one of multiple communication channel options. For instance, when establishing a communication session (e.g., a video conference), a sending network device establishes two potential communication channels with a receiving network device participating in the communication session. The sending network device determines which of the two potential communication channels is best suited for providing a media stream related to the communication session (e.g., an audio and/or video media stream), and assigns that communication channel as an active communication channel over which the sending network device provides the media stream to the receiving network device.

20 Claims, 12 Drawing Sheets

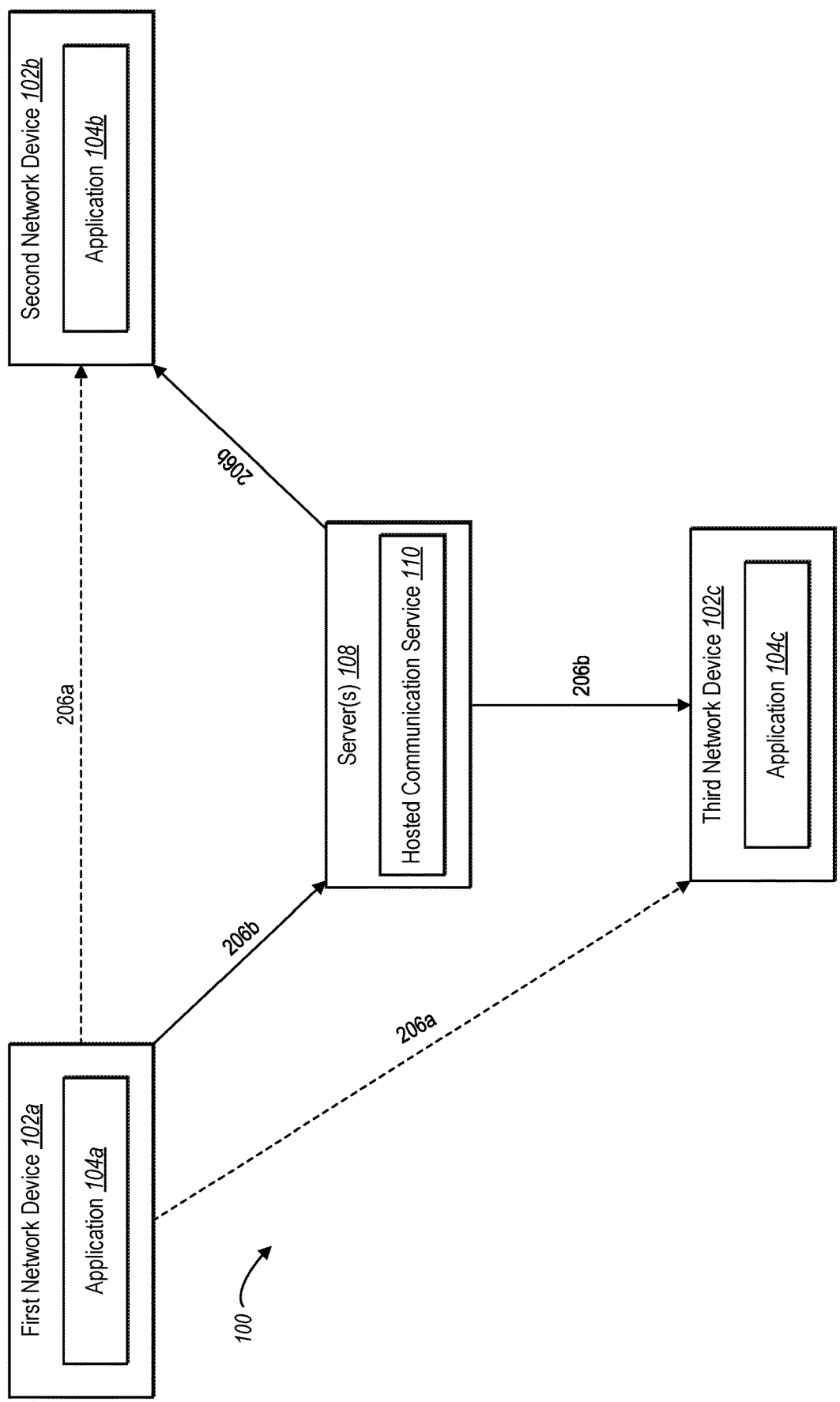

DYNAMICALLY CONTROLLING COMMUNICATION CHANNELS DURING A COMMUNICATION SESSION

BACKGROUND

Modern communication technology enables users to communicate using network or Internet-based communication systems. Modern computer devices and communication networks can allow two users to communicate in a real-time communication session (e.g., a voice or a video call). Additionally, modern communication technology enables the participation of multiple users in a single communication session (e.g., a conference call or a video conference). Despite their current capabilities, conventional communication systems suffer from several technological problems.

For example, as the number of participating network devices in a communication session increases, the communication quality (e.g., audio and/or video quality) and communication reliability can significantly decrease in many conventional communication systems. For instance, some conventional systems rely on a peer-to-peer transfer of media streams where each network device in a communication session sends separate media streams to each of the other participating network devices. In addition, each network device in the communication session receives separate media streams from each of the other participating network devices. Therefore, in conventional peer-to-peer communication systems, an individual network device may simultaneously capture and send multiple media streams (e.g., one media stream to each participant), as well as receive, process, and display several other media streams (e.g., one media stream from each participant).

As the number of participating network devices in a communication session increases, the number of media streams that a particular network device simultaneously sends and receives can result in a communication bandwidth bottleneck, which in turn diminishes the quality of the communication session (e.g., results in distorted audio or video). Moreover, simultaneously sending, receiving, processing, and displaying a large number of media streams often overloads the computational capacity of an individual network device, which can result in diminished quality and dropped connections during a communication session. Accordingly, conventional communication systems that rely on a peer-to-peer transfer of media streams are significantly limited in the number of network devices that can participate in a communication session without exceeding computer hardware capabilities and communication bandwidth resources to the point of affecting the quality of the communication session.

As an alternative to peer-to-peer systems, some conventional communication systems rely on a central mixing unit that receives a media stream from each network device participating in a communication session, mixes the media streams into a combined media stream, and then sends the combined media stream to each of the participating network devices. In some cases, the central mixing unit can relieve computational strain on an individual network device when compared to a peer-to-peer system because each network device sends only a single media stream and receives only a single media stream, however, the central mixing unit often becomes overloaded with the addition of communication session participants.

For example, the process of combining several audio and/or video media streams is computationally expensive. Indeed, as the number of participants in a communication session increases, the more computational burden is placed on the central mixing unit, and eventually the central mixing unit is overloaded and fails to effectively mix the media streams. Accordingly, conventional systems that rely on a central mixing unit to combine the media streams from multiple communication session participants have technical limitations to the number of participants that can participate without affecting the quality of the communication session or without dropping participants from the communication session.

Thus, there are several disadvantages with regard to conventional communication systems.

SUMMARY

Systems, methods, and computer readable medium described herein enable network devices participating in a communication session to dynamically switch between sending media streams to a participating network device through one of multiple communication channel options. In some embodiments, for instance, when establishing a communication session (e.g., a video conference), a sending network device establishes two potential communication channels with a receiving network device participating in the communication session. The sending network device determines which of the two potential communication channels is best suited for providing a media stream related to the communication session (e.g., an audio and/or video media stream), and assigns that communication channel as an active communication channel over which the sending network device provides the media stream to the receiving network device.

Additionally, while providing the media stream via the active communication channel, the sending network device maintains the other communication channel as an alternative communication channel option. During the communication session, the sending network device monitors both the active and alternative communication channels to continuously determine which of the two communication channels results in higher communication session quality and reliability. For example, during the communication session, the sending network device may detect that the alternative communication channel becomes superior to the active communication channel based on a variety of channel characteristics. Based on detecting that the alternative communication channel is superior to the active communication channel, the sending network device can dynamically activate the alternative communication channel and provide the media stream to the receiving network device via the now activated alternative communication channel.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIG. 2B illustrates another example of communication channels between multiple network devices in accordance with one or more embodiments disclosed herein;

DETAILED DESCRIPTION

Figure 1:
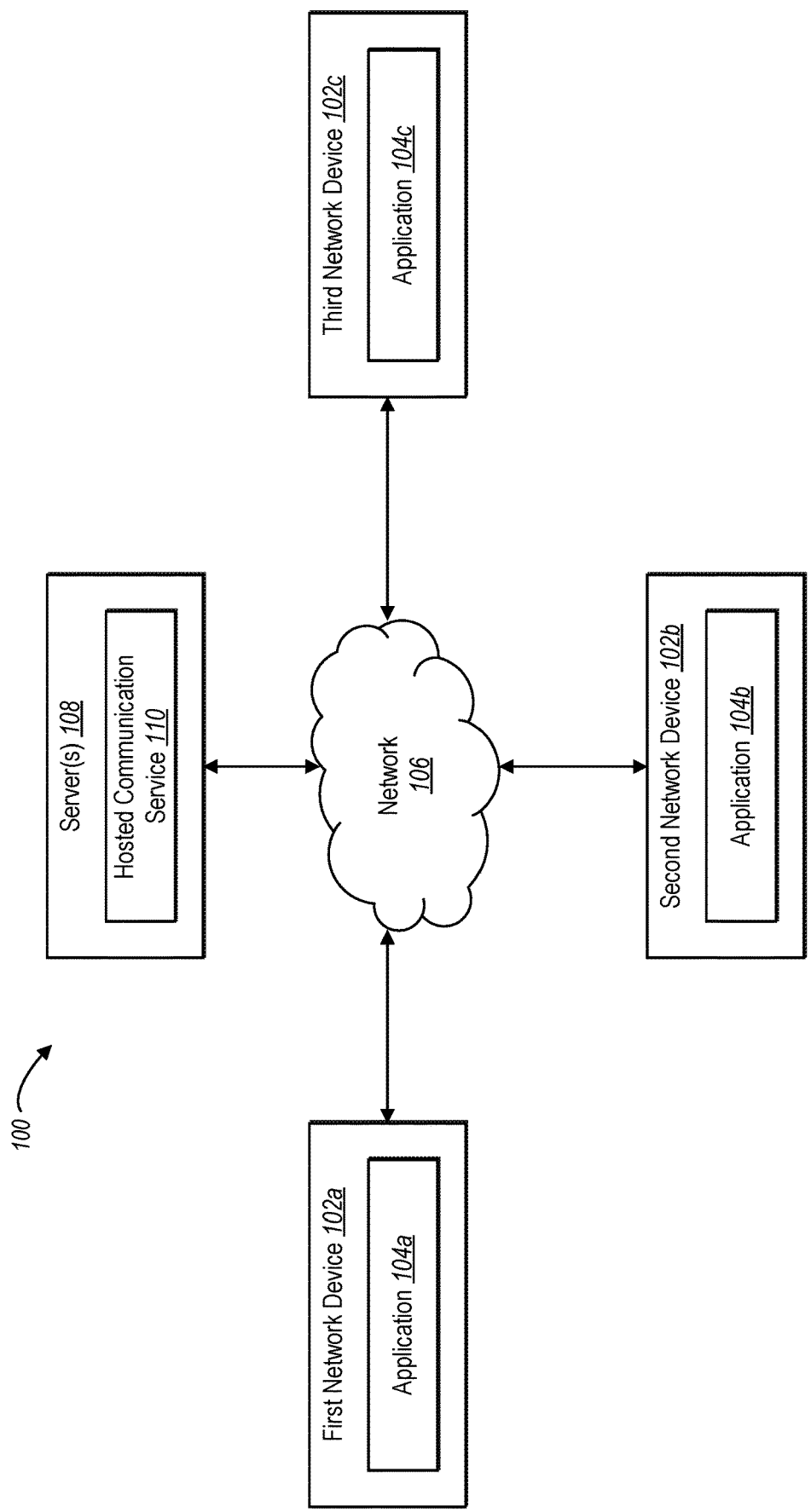
FIG. 1 illustrates a network-based communications system in accordance with one or more embodiments disclosed herein.

This disclosure describes one or more embodiments of a network-based communication system that enables network devices within a communication session to dynamically switch between sending media streams to participating network devices through one of multiple communication channel options. For instance, when establishing a communication session (e.g., a video conference), the network-based communication system allows a network device (e.g., a computer device associated with a user) to establish two potential communication channels with another network device (e.g., a computer device receiving the media stream from the sending network device). The network-based communication system further allows the network device to continuously monitor the two established communication channels and dynamically switch between the two channels throughout the communication session based on which of the two channels will provide the higher quality and reliability.

Using the processes and systems described herein, the system can provide a quality and reliable communication session that includes many more participants compared to conventional systems, as will be explained in further detail below. To provide an overview of various features, functions, and processes the system provides, however, the following overview discusses a communication session in terms of two network devices. In addition, the overview refers to a sending network device and a receiving network device. The sending network device refers to a network device that is capturing and providing a media stream associated with a communication session, and the receiving network devices is a network device that is receiving the media stream from the sending network device. The designation of "sending" network device and "receiving" network device is for purposes of explanation only as it will be understood, based on the disclosure below, that both network devices are actually sending and receiving media streams simultaneously to provide a real-time communication session experience to users associated with each of the network devices.

As mentioned briefly above, when initially establishing a communication session the network-based communication system (or simply "system") causes the sending network device to establish two communication channels with the receiving network device. In addition, the network-based communication system enables the sending network device to determine which of the two communication channels is best suited for providing a media stream related to the communication session (e.g., an audio and/or video media stream), and assigns that communication channel as an active communication channel through which the sending network device initially provides the media stream to the receiving network device.

While providing the media stream via the active communication channel, the sending network device maintains the availability of the other communication channel as an alternative communication channel option in the event the quality and/or reliability of the currently active communication channel degrades. For example, the system enables the sending network device to monitor both the active and alternative communication channels during the communication session to continuously determine which of the two communication channels results in higher communication session quality and reliability. Based on monitoring the active and alternative communication channel, the sending network device may detect that the alternative communication channel becomes superior to the active communication channel, and in response, the sending network device can dynamically activate the alternative communication channel and switch to provide the media stream to the receiving network device via the now activated alternative communication channel. The sending network device continues to monitor both communication channels and may switch between the communication channels several times during a communication session based on changes in communication bandwidth, network quality, number of participants in the communication session, location of participants, as well as other factors.

In one or more embodiments, the system allows the sending network device to switch dynamically between two communication channels having two different communication modes. For example, a first communication channel can be associated with a first communication mode, while a second communication channel is associated with a second communication mode that is different from the first communication mode. In some embodiments the first communication mode includes a direct peer-to-peer communication mode through which the sending network device provides a media stream to the receiving network device via a peer-to-peer connection, while the second communication mode includes an indirect or relay communication mode where the sending network device sends the media stream to a forwarding unit, and the forwarding unit provides the media stream to the receiving network device. Accordingly, the sending network device can dynamically switch between providing the media stream to a receiving network device via a peer-to-peer communication mode and a relay communication mode depending on which communication mode is most favorable to providing a quality and reliable communication session.

In one or more embodiments, the sending network device monitors a number of channel characteristics to determine whether to maintain the active channel or switch to send streams through the inactive or alternative channel. Once the communication session is initiated, the sender network device generates, sends, and receives test transmissions to and from the receiver network devices through the active and inactive communication channels to determine channel characteristics for each channel. In addition, the sender network device may determine a number of factors that may affect which communication channel the sender device determines to activate, including the type of conference (e.g., voice or video), which network devices are broadcasting or idle, the geographic location of network devices, and/or the number of participants. Based on the comparison of channel characteristics between communication channels, the sender network device can determine to dynamically switch from the active communication channel to the alternative communication channel.

As just mentioned, as part of determining whether to switch from the active communication channel to an inactive communication channel, the sending network device can compare the alternative channel's characteristics to the active channel's characteristics. In one or more embodiments, the sending network device determines a score associated with each communication channel based on a channel's characteristics. The sending network device can then compare the scores for each of the communication channels to determine the optimal communication channel. In addition, because switching from one communication channel to another can result in a minor communication lag, in at least some embodiments, the system causes the difference in scores between each of the communication channels to reach a preset threshold prior to switching between the active communication channel and the alternative communication channel. By determining that the difference in characteristics reaches a threshold, the communication system minimizes the amount of unnecessary switching between two communication channels that are relatively of the same quality and reliability.

In addition to determining to switch from the active communication channel to the alternative communication channel based on each of the channels' characteristics, the system can cause the sender network device to execute the switching between the communication channels based on detecting a trigger that indicates an optimal time to switch. In particular, if the sender network device switches channels at an inopportune moment, the switching from one channel to the other channel can cause a slight lag or jump in the presentation of the media stream at the receiving network device. Accordingly, in some embodiments, once the sending network device determines to switch to the alternative channel, the sending network devices waits to detect a trigger event before executing the switch. An example of a trigger event includes, for instance, the sending network device detecting if the user associated with the sending computing device is actively speaking in the communication session, or if the user stops talking or has a pause in speaking. Upon detecting the trigger event, the sending network device proceeds to switch communication channels. As a result, any effects on the media stream presentation at the receiving network device are minimized when switching channels, thus further increasing the overall quality of the communication session.

When the principles generally described above with respect to two network devices are applied to a communication session that includes multiple participating network devices (e.g., 5, 10, 20, 50, 100, or more), the result is a dynamic network-based communication session that is fluidly optimized to provide a high quality and reliable communication session. Indeed, because each participating network device establishes two potential communication channels with every other participating network device, the system enables each network device to select an optimal communication channel between it and the other network devices. Moreover, because the two communication channels can also include two different communication modes (e.g., peer-to-peer or relay modes) the system allows a network device to dynamically determine and use the communication mode that provides an optimal communication session, even when the properties associated with the communication session are changing (e.g., adding participants, removing participants, and/or changes in communication bandwidth resources). The result is a communication session that can incorporate a combination of communication modes between network devices to optimize the communication quality and reliability of a communication session.

Indeed, because the system allows for a network device to determine the best communication channels from the perspective of the network device, the system provides an efficient and dynamic communication session that spreads communication configuration intelligence for a communication session across the individual network devices. In other words, each individual network device determines the best communication mode to use with each other participating network device based on continually monitoring characteristics of the communication session (e.g., number of participants, geographic location of participants), characteristics of communication channels (e.g., available bandwidth), processing resources available on the network device, and other factors as explained below in detail. Accordingly, each network device can independently determine which communication mode to use with another network devices, and the overall effect across the entire communication session is an increase in quality and reliability.

One or more embodiments of the system solve multiple problems found in conventional communication systems. For example, various embodiments of the system resolve technical limitations in conventional systems that rely on a peer-to-peer transfer of media streams. Because each network device in such conventional systems typically sends and receives media streams from each participating network device, a network device's computational resources can become overloaded as the number of participating network devices increases, resulting in poor quality and potential reliability problems. Embodiments in the current disclosure resolve this issue by optimizing the number of incoming and outgoing media streams at individual network devices as additional devices are added to a communication session. For example, to optimize a communication session, a network device can determine to provide a single media stream to a forwarding unit that forwards the media stream to multiple participating network devices, while at the same time the network device can determine to provide several other media streams directly to one or more other network devices via a peer-to-peer type of a communication channel. Accordingly, based on the principles described herein, the communication system can reliably facilitate high-quality communication sessions with a large number of participants (e.g., 10, 20, 50, 100, or more).

Similarly, the system overcomes technical limitations of conventional systems that rely on a central mixing unit to receive media streams, mix the media streams, and generate a mixed stream for each network device in a communication session. As explained above, the mixing and generation of a large number of media streams is computationally expensive, and accordingly, conventional systems that rely on a central mixing unit are often limited in the number of participants that can participate in a communication session. The disclosed system overcomes these limitations by enabling each network device to determine whether to provide a media stream via a direct communication channel or an indirect communication channel based on optimizing for quality and reliability. Thus, an individual network device can detect if a forwarding unit is becoming overburdened and switch to providing one or more media streams through a direct communication channel. Indeed, compared to conventional systems that consolidate all of the computational strain in a single central mixing unit, the disclosed system optimally spreads the computational burden among each participating network device and one or more forwarding units.

Additionally, embodiments of the present disclosure overcome technical problems in conventional systems that typically cause conventional systems to be unreliable. Conventional systems typically rely on a single communication mode and establish only a single channel of communication between each network device. Thus, if the single channel of communication degrades to the point of usefulness or is simply broken, one or more network devices may unexpectedly drop from the communication session. Embodiments of the disclosed system resolve these reliability issues by using multiple communication channels and communication modes to connect participating network devices.

For instance, the system enables each network device to determine the optimal connection channel and mode in order to use the most reliable communication channel. In addition, in the event there is a sudden decline in the quality or a break in the active communication channel, the network device can dynamically switch to the alternative communication channel, thus preserving the communication session. Thus, not only does the system minimize the potential of dropped connections during a communication session based on a network device determining an optimal communication channel, but the system also provides an alternative communication channel as a backup that allows a network device to activate an alternative pre-established communication channel in the event of a sudden and catastrophic failure in the active communication channel (e.g., a physically damaged a communication line).

Furthermore, embodiments of the system improve inefficiencies of conventional systems in utilizing bandwidth and processing resources. Unlike many conventional systems that rely solely on a single communication mode, embodiments of the disclosed communication system allow network devices to switch between various communication modes based on communication channel characteristics associated with each of the communication modes. Accordingly, by switching between communication modes, a network device can determine, at the network device level, how to most efficiently utilize bandwidth resources available to the network device, as well as how to most efficiently use processing resources on the network device itself. Additional advantages are also apparent based on the below description of the system in reference to the figures.

As illustrated by the foregoing discussion, the present disclosure utilizes a variety of terms to describe features and advantages of the system. Additional detail is now provided regarding the meaning of such terms. As used herein, the term "communication channel" refers to a connection for an electronic transmission between computer devices. For example, a communication channel refers to a logical connection used to convey digital data (e.g., a media stream) from a sending computing device to a receiving computing device. A communication channel can include one or both of a cable (e.g., wired) and broadcast (e.g., cellular and/or wireless) connections. In addition, a communication channel can include various intermediary devices or connections between the two computer devices that the communication channel connects. As used herein, the term communication channel can digital, multiplexed, simplex, virtual, unicast, multicast, or any other kind of channel known in the art.

As further used herein, the term "communication mode" refers to a type of communication channel. Examples of communication modes can include direct and indirect communication channels. For instance, an example of a direct communication mode is a peer-to-peer communication channel that allows network devices to share digital information (e.g., media streams) without the need for a central coordination by servers. Alternatively, an example of an indirect communication mode is a relay communication channel that utilizes a forwarding unit as an intermediary between two network devices. For example, in a relay communication mode, a sending network device provides a media stream to a forwarding unit, and the forwarding unit provides the media stream to a receiving network device. The term communication mode also refers to other known types of communication channels between network devices.

As used herein, the term "media" refers to digital data that may be transmitted over a communication network. Examples of media include, but are not limited to, digital audio, digital video, digital images, digital documents, files, and/or other types of digital data. Accordingly, media may refer to images, video, audio, text, documents, animations, screen sharing, or any other data that may be transmitted over a communication network. In general, media can include user-generated content (e.g., content that a user captures using a media capturing device such as a smart phone or a digital camera) as well as non-user-generated media (e.g., content generated by an entity or third-party).

The term "media stream," as used herein refers generally to a flow of media that is provided over time. An example of a media stream can include a stream of live, near-live, or semi-live media from one network device to one or more other network devices. A media stream can include sending packets of data from one computing device to another computing device. In general, a media stream includes sending images, videos, and/or audio between computing devices. Further, when a computing device provides a media stream, the computing device may encode and/or encrypt a media stream before transmitting the media stream to the one or more other computing devices.

Referring now to the figures, FIG. 1 illustrates a network-based communication system 100 (or simply "system 100") in accordance with one or more embodiments disclosed herein. As illustrated in FIG. 1, the system 100 can include, but is not limited to, a first network device 102*a*, a second network device 102*b*, and a third network device 102*c* (collectively referred to as "network devices 102"), a first application 104*a* on the first network device 102*a*, a second application 104*b* on the second network device 102*b*, and a third application 104*c* on the third network device 102*c* (collectively referred to as "applications 104"), one or more server(s) 108, and a hosted communication service 110 on the server 108. FIG. 1 shows only one example and other embodiments of the system 100 may include any number of additional network devices 102 as well as additional servers 108.

In one or more embodiments, the network devices may include, but are not limited to, mobile devices (e.g., smartphones, tablets), laptops, desktops, network phones (e.g., VoIP devices), or any other type of computing device, such as those described below in relation to FIGS. 8-9. In one or more embodiments, applications 104 are installed as software, hardware, or a combination of software and hardware on network devices 102. In some embodiments, for example, applications 104 are implemented across the system 100, where all or part of the software or hardware associated with the application 104 is run on the network device (e.g., network device 102a) and/or server(s) 108. In some embodiments, applications 104 are a web-based application executed within a web browser on the network devices 102. In other embodiments, applications 104 may be a native application on the network devices 102.

In addition, the server(s) 108 can include, support, or be part of a web server, a program server, an application server, a datacenter, or a combination of server devices as described below in relation to FIGS. 7-8. As further shown in FIG. 1, the server(s) 108 includes a hosted communication service 110. The hosted communication service 110 may facilitate communication between network devices 102. For example, in some embodiments the hosted communication service 110 includes a forwarding unit that forwards data packets and media streams between network devices 102. As will be explained below, the hosted communication service becomes part of an active relay communication channel to forward a media stream received from one network device and send the media stream to another network device during a communication session.

As also illustrated in FIG. 1, the server(s) 108 and network devices 102 are communicably connected through a network 106. In some configurations, the network 106 can be the Internet, an intranet, a private network, or another type of computer network. The network 106 can be a combination of Internet and intranet networks, or any of the networks described below in relation to FIGS. 7-8. Although FIG. 1 illustrates a particular arrangement of components, various additional arrangements are possible. For example, the network devices 102 can communicate directly with the server(s) 108, or can communicate directly with each other, rather than via the network 106.

A user (e.g., a participant in a communication session) can utilize the network device 102a, for example, to participate in a communication session with users associated with network device 102b and network device 102c. For instance, the user can use the network device 102a to participate in an audio conference call, a video conference, or other media communication session with network devices 102b and 102c. To establish and participate in the communication session, the network work device 102a communicates with the server(s) 108 to access the hosted communication service 110. The hosted communication service can provide information and instructions to allow the network device 102a to establish multiple communication channels with each of the second network device 102b and third network device 102c. Moreover, in some embodiments, the server(s) 108 can include a forwarding unit that receives a media stream from the first network device 102a and provides the media stream to one or more of the second network device 102b and/or third network device 102c.

In one or more embodiments, the system 100 can enable each of the network devices 102 to establish at least two communication channels with the other network devices 102 when initiating a communication session. For example, the system 100 enables network device 102a to establish a first communication channel with network device 102b having a first communication mode (e.g., a peer-to-peer mode), and in addition, the system enables the network device 102a to establish a second communication channel with network device 102b having a second communication mode (e.g., a relay mode). Likewise, the network device 102a can establish two communication channels with network device 102c. In addition, network device 102b can establish two communication channels with each of network devices 102a and 102c, and network device 102c can establish two communication channels with each of network devices 102a and 102b. Each network device (e.g., network device 102a) monitors the various communication channels corresponding to each of the other network devices to determine which communication channel to utilize during the communication session, as will be explained in detail with respect to FIGS. 2A-2D.

In some cases, the server(s) 108 may assist the first network device 102a in setting up the multi-device communication with the second network device 102b and third network device 102c. In other instances, once the server(s) 108 sets up or establishes the multi-device communication session, the network devices 102 can facilitate the multi-device communication session without direct support of the server 108. In addition, in one or more embodiments, the first network device 102a can directly establish the multi-device communication session with the second network device 102b and the third network device 102c without involvement from the server(s) 108.

Figure 2A:
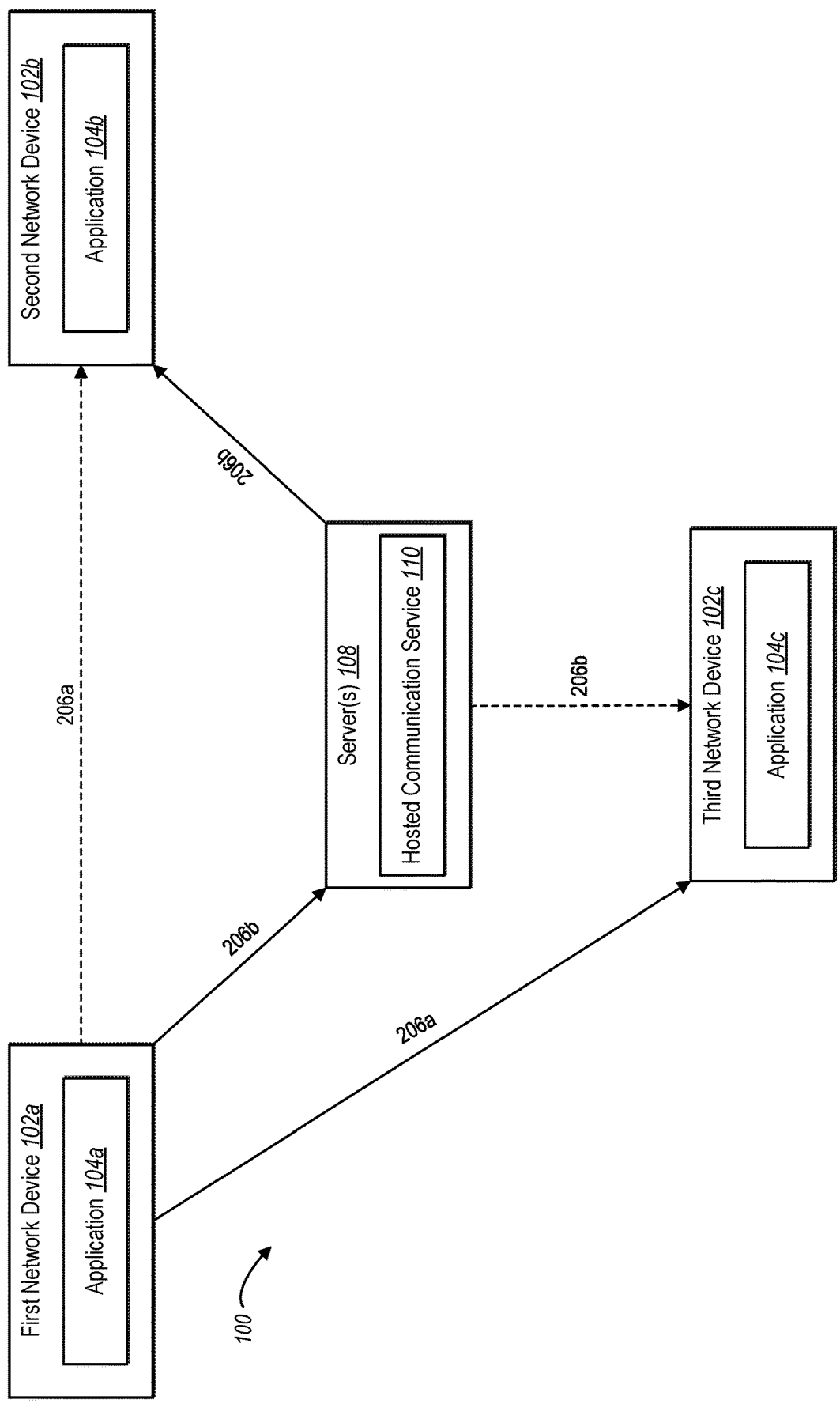
FIG. 2A illustrates an example of communication channels between multiple network devices in accordance with one or more embodiments disclosed herein.

FIGS. 2A-2D illustrate examples of various communication channel configurations based on a network device establishing two communication channels with the other network devices participating in a communication session and determining which of the two established communication channels to activate during a communication session. For ease of explanation, the system 100 is described as having a set number of network devices and server(s). However, the principles described with respect to FIG. 2A-2D can be implemented within a system 100 having any number of network devices and server(s). Accordingly, and as shown in FIG. 2A, the system 100 includes the network devices 102 and the server(s) 108 participating in a multi-device communication session. The system 100, network devices 102, and server(s) 108 shown in FIG. 2 can represent the system 100, network devices 102, and server(s) 108 described above with respect to FIG. 1.

As illustrated in FIGS. 2A-2D, network devices 102 establish an active communication channel and an alternative communication channel between each of the other network devices. Active channels are shown in FIGS. 2A-2D as solid arrows between network devices 102 and/or server(s) 108. Alternative communication channels (e.g., inactive communication channels) are shown in FIGS. 2A-2D as dashed arrows between network devices 102 and/or server(s) 108. For example, and as shown in FIG. 2A, the first network device 102a is connected to the third network device 102c with an active communication channel 206a (i.e., the solid arrow directly between the first network device 102a and the third network device 102c). In addition, FIG. 2A illustrates that the first network device 102a is connected to the second network device 102b with an alternative communication channel 206b (i.e., the dashed arrow directed between the first network device 102a and the second network device 102b).

In addition to illustrating active communication channels and alternative communication channels, FIG. 2A further illustrates communication channels having different communication modes. For example, FIG. 2A illustrates that the active communication channel 206a between the first network device 102a and the third network device 102c is a direct communication mode (e.g., a peer-to-peer communication mode). In contrast, the active communication channel 206b between the first network device 102a and the second network device 102b is an indirect communication mode (e.g., a relay communication mode) where the first network device provides a media stream to the server 108, and the server 108 forwards the media stream to the second network device 102b. Accordingly, for purposes of explanation, communication channels that have a direct or peer-to-peer communication mode include an "a" in the reference number in the figures (e.g., 206a), and communication channels that have an indirect or relay communication mode include a "b" in the reference number (e.g., 206b).

FIG. 2A illustrates an example embodiment of the system 100 in which the first network device 102a establishes two communication channels with the second network device 102b and two communication channels with the third network device 102c. Moreover, FIG. 2A illustrates an embodiment where the first network device determines to activate communication channels such that the first network device provides media streams to the second network device 102b and the third network device 102c using a combination of an active peer-to-peer communication channel and an active relay communication channel.

Specifically, and as shown in FIG. 2A, upon initiating a communication session with the second network device 102b and the third network device 102c, the first network device 102a establishes a direct or peer-to-peer communication channel 206a and an indirect or relay communication channel 206b with the second network device 102b. Similarly, the first network device generates a direct or peer-to-peer communication channel 206a and an indirect or relay communication channel with the third network device 102c, as illustrated in FIG. 2A. Upon establishing these communication channels, the first network device determines and selects a communication channel to activate for each of the second network device 102b and third network device 102c. Additional details about the first network device 102a selecting a communication channel to activate are provided below with respect to FIGS. 3A-4.

As briefly mentioned above, FIG. 2A illustrates an embodiment where the first network device 102a has determined to use a combination of communication modes to facilitate the communication session. For example, FIG. 2A illustrates that the first network device activates the indirect or relay communication channel 206b between the first network device 102a and the second network device 102b, which is shown by the solid arrow 206b between the first network device 102a and the server 108 and the arrow 206b between the server 108 and the second network device 102b. Accordingly, at a point of the communication session illustrated in FIG. 2A, the first network device 102a is providing a media stream to the second network device 102b via the active relay communication channel 206b that includes the server 108.

While the first network device 102a is providing the media stream to the second network device 102b via the active relay communication channel 206b, the system 100 allows the first network device to maintain the inactive direct or peer-to-peer communication channel 206a between the first network device 102a and the second network device 102b, which is shown by the dashed arrow 206a between the first and second network devices 102a and 102b. Accordingly, the direct or peer-to-peer communication channel 206a is an alternative communication channel that is available for use during the communication session. In other words, and as will be explained in additional detail below, the first network device can determine to dynamically switch from providing the media stream to the second network device 102b via the active relay communication channel 206b to providing the media stream to the second network device via the peer-to-peer communication channel 206a at any point during the communication session.

In contrast to providing a media stream via an active relay communication channel, FIG. 2A illustrates that the first network device 102a can also provide a media stream to the third network device 102c through an active peer-to-peer communication channel 206a, illustrated by the solid arrow between the first and third network devices 102a and 102c. As explained above, the system 100 allows the first network device to establish a direct or peer-to-peer communication channel 206a and an indirect or relay communication channel 206b with the third network device 102c. Furthermore, FIG. 2A shows that the first network device determines to activate the direct or peer-to-peer communication channel 206a to provide the media stream to the third network device 102c, while the indirect or relay communication channel 206b is maintained as the alternative communication channel (shown by the dashed arrow between the server 108 and the third network device 102c).

Accordingly, FIG. 2A illustrates an example scenario where the first network device 102a sends media streams to the second network device 102b and the third network device 102c using a combination of an active peer-to-peer communication channels 206a and an active relay communication channel 206b. In addition, while the first network device 102a provides media streams via the active communication channels, the first network device 102a also maintains the alternative communication channels during the communication session. In particular, the first network device 102a pings, sends data packets, requests report receipts, and/or otherwise maintains the alternative peer-to-peer communication channel 206a with the second network device 102b and the alternative relay communication channel 206b with the third network device 102c.

During the communication session, the first network device 102a monitors communication characteristics (e.g., properties of the communication channel representing quality and reliability) for the active and alternative communication channels with each other device participating in the communication session as well as characteristics of the communication session (e.g., number of participants, location of participants). Based on monitoring the active and alternative communication channels, the first network device 102a can determine that it would be advantageous (e.g., provide a higher quality connection, a more reliable connection, etc.) to switch from the active communication channel to the alternative communication channel. Accordingly, the first network device can deactivate the active communication channel and activate the alternative communication channel to provide a media stream through the alternative communication channel.

For example, FIG. 2B illustrates an example where the first network device 102a switches from providing media streams using a combination of peer-to-peer and relay communication modes to using only a relay communication mode. As shown in FIG. 2B, the first network device 102*a* determined to deactivate the direct or peer-to-peer communication channel 206*a* with the third network device 102*c* (shown by the now dashed arrow between the first network device 102*a* and the third network device 102*c* in FIG. 2B). At the same time the first network device 102*a* deactivates the direct or peer-to-peer communication channel 206*a*, the first network device activates the alternative relay communication channel 206*b* with the third network device 102*c* as shown by the solid arrow between the first network device 102*a* and the server 108 and the solid arrow between the sever 108 and the third network device 102*c*.

The result of the first network device 102*a* switching from the communication scheme shown in FIG. 2A to the communication scheme shown in FIG. 2B is that the first network device 102*a* switches from using a combination of direct and indirect communication modes to only using an indirect or relay communication mode. In particular, FIG. 2B illustrates that the first network device 102*a* sends media streams for the communication session to the second and third network devices via relay communication channels 206*a*. Accordingly, instead of the providing two media streams over two active communication channels (as shown in FIG. 2A), the first network device 102*a* provides a single media stream to the server 108, and the server sends a copy of the media stream to both the second and third network devices 102*b* and 102*c*.

As will be explained further below with respect to FIGS. 3A-4, the first network device can determine to switch from a combined communication channel mode to a single communication channel mode based on multiple factors. For example, the first network device 102*a* may determine that the active peer-to-peer communication channel 206*a* with the third network device 102*c* (see FIG. 2A) degrades in quality. Alternatively, or in addition to, the first network device 102*a* may determine that the upload bandwidth availability is limited, and therefore, it would be better to only send a single media stream (e.g., via the relay communication channel 206*b*) instead of providing two media streams. Other factors and communication characteristics can also contribute to the first network device determining to switch communication channels, as explained below.

Figure 2C:
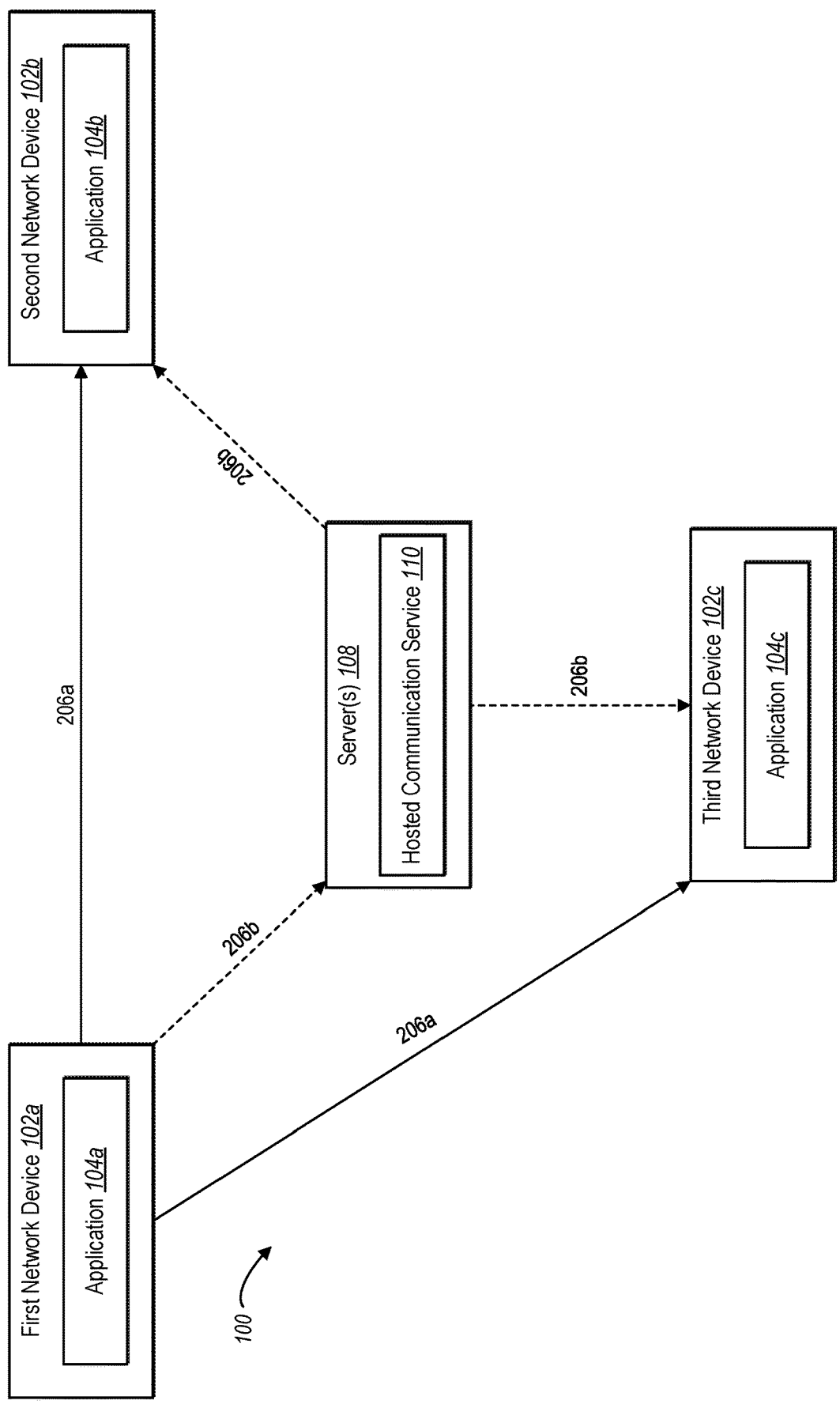
FIG. 2C illustrates yet another example of communication channels between multiple network devices in accordance with one or more embodiments disclosed herein.

While FIG. 2B illustrates a scenario during a communication session in which the first client device 102*a* utilizes only relay communication channels to send media streams, FIG. 2C illustrates an example scenario in which the first network device 102*a* uses only active peer-to-peer communication channels 206*a* to send media streams to the second network device 102*b* and the third network device 102*c*. For example, when operating in the communication scheme in either FIG. 2A or FIG. 2B, the first network device 102*a* can determine that the peer-to-peer communication channels 206*a* are superior or would otherwise result in a higher quality and/or more reliable communication session compared to using the relay communication channels 206*b*. For instance, the first network device may detect that the server 108 is becoming overburdened.

Accordingly, the first network device 102*a* can activate the direct or peer-to-peer communication channel 206*a* with the second network device 102*b* as indicated by the solid arrow between the first and second network devices 102*a* and 102*b* shown in FIG. 2C. In addition, the first network device 102*a* can activate the direct or peer-to-peer communication channel 206*a* with the third network device 102*c*, as shown by the solid arrow between the first and third network devices 102*a* and 102*c* in FIG. 2C. The result is a communication scheme where the first network device 102*a* is communicating with the other network devices 102*b* and 102*c* using only a peer-to-peer communication mode.

The process of the first network device monitoring both active and alternative communication channels with each participating network device, determining whether to switch communication channels, and deactivating active channels and activating alternative channels continues throughout a communication session. Indeed, based upon individual communication channel characteristics, as well as overall communication session characteristics, the first network device 102*a* can switch from a combination communication scheme (i.e., actively sending media streams using both relay communication channels and peer-to-peer communication channels), a relay only communication scheme (i.e., actively sending media streams using only relay communication channels), and a peer-to-peer communication scheme (i.e., actively sending media streams using only peer-to-peer communication channels). In other words, the first network device 102*a* can determine to switch back and forth between the various communication schemes shown in FIGS. 2A-2C throughout the communication session.

Figure 2D:
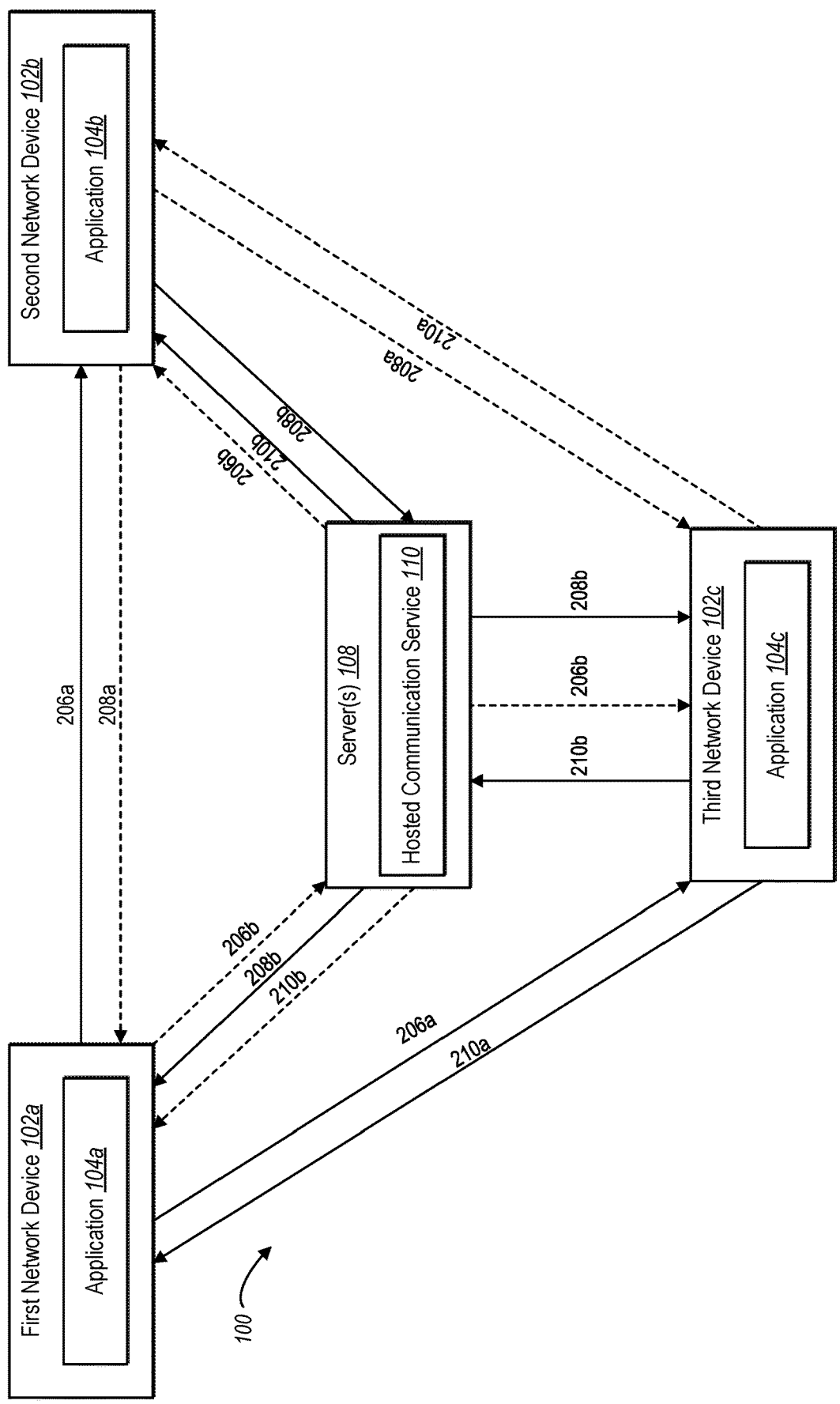
FIG. 2D illustrates yet another example of communication channels between multiple network devices in accordance with one or more embodiments disclosed herein.

In addition to the first network device 102*a* dynamically switching between communication channels having different communication modes, the second network device 102*b* and the third network device 102*c* are simultaneously performing the same functions described above with respect to the first network device 102*a*. For example, FIG. 2D illustrates an example communication scheme of the system 100 that shows all the active and alternative communication channels between all of the first, second, and third network devices 102*a*, 102*b*, and 102*c*. Indeed, FIG. 2D illustrates that the first network device 102*a* is providing media streams to the second and third network devices using active direct or peer-to-peer communication channels 206*a*, while maintaining alternative indirect or relay communication channels 206*b*.

In contrast, the second network device 102*b* provides media streams to the first network device 102*a* and the third network device 102*c* using active indirect or relay communication channels 208*b*, meaning the second network device 102*b* sends a single media stream to the server 108 that then forwards the media stream to both the first network device 102*a* and the third network device. In addition, the second network device 102*b* maintains the alternative direct or peer-to-peer communication channels 208*a* with both the first and third network devices, as shown in FIG. 2D.

Furthermore, FIG. 2D illustrates that the third network device 102*c* provides media streams to the first and second network devices 102*b* and 102*c* using a combination of direct and indirect communication channels (e.g., a combination of peer-to-peer and relay communication channels). For instance, FIG. 2D illustrates that the third network device 102*c* provides a media stream to the first network device 102*a* using an active direct or peer-to-peer communication channel 210*a*, while at the same time, the third network device 102*c* provides a media stream to the second network device 102*b* via an active indirect or relay communication channel 210*b*. The third network device 102*c* also maintains an alternative relay communication channel 210*b* with the first network device 102*a* and an alternative peer-to-peer communication channel 210*a* with the second network device 102*b*.

Therefore, FIG. 2D illustrates that the system 100 can allow each of the individual network devices 102 to independently determine which communication channel and which communication mode to use to provide a media stream to another network device during a communication session. Significantly, the communication scheme used by each of the network devices 102 can vary from network device to network device within a single communication session. In other words, the system enables each network device to select communication channels and communication modes that will result in the best quality and reliability from the perspective of the individual network device. For example, while the first network device 102a determines to activate the peer-to-peer communication channel 206a to provide the second network device 102b a media stream, the second network device 102b can determine to activate the relay communication channel 208b to provide the first network device 102a a media stream.

As described above with respect to FIGS. 2A-2C, each of the network devices 102 can continually monitor communication channel characteristics and the communication session characteristics and dynamically switch to alternate communication channels for one or more other devices. Thus, based on evolving network conditions (e.g., bandwidth resources, server 108 capacity, network device 102 processing capacity, etc.) and evolving communication session characteristics (e.g., adding participants, removing participants, which participants are speaking, etc.), each of the network devices and continuously and dynamically selects which communication channels corresponding to communication modes to activate and deactivate. Accordingly, the system 100 provides a distributed algorithm across all participating network devices that results in a higher quality and more reliable communication session as a whole.

Additional details regarding the specifics of the distributed algorithm are explained below with respect to FIGS. 3A-4. FIG. 3A illustrates a sequence-flow 300 illustrating interactions between server(s) 108, the first network device 102a, the second network device 102b, and the third network device 102c in the network-based communication system 100, as described above with respect to FIGS. 1-2D. In particular, FIG. 3A illustrates an example sequence of acts within the system 100 to allow the first network device 102a to initiate a multi-device communication session.

Figure 3A:
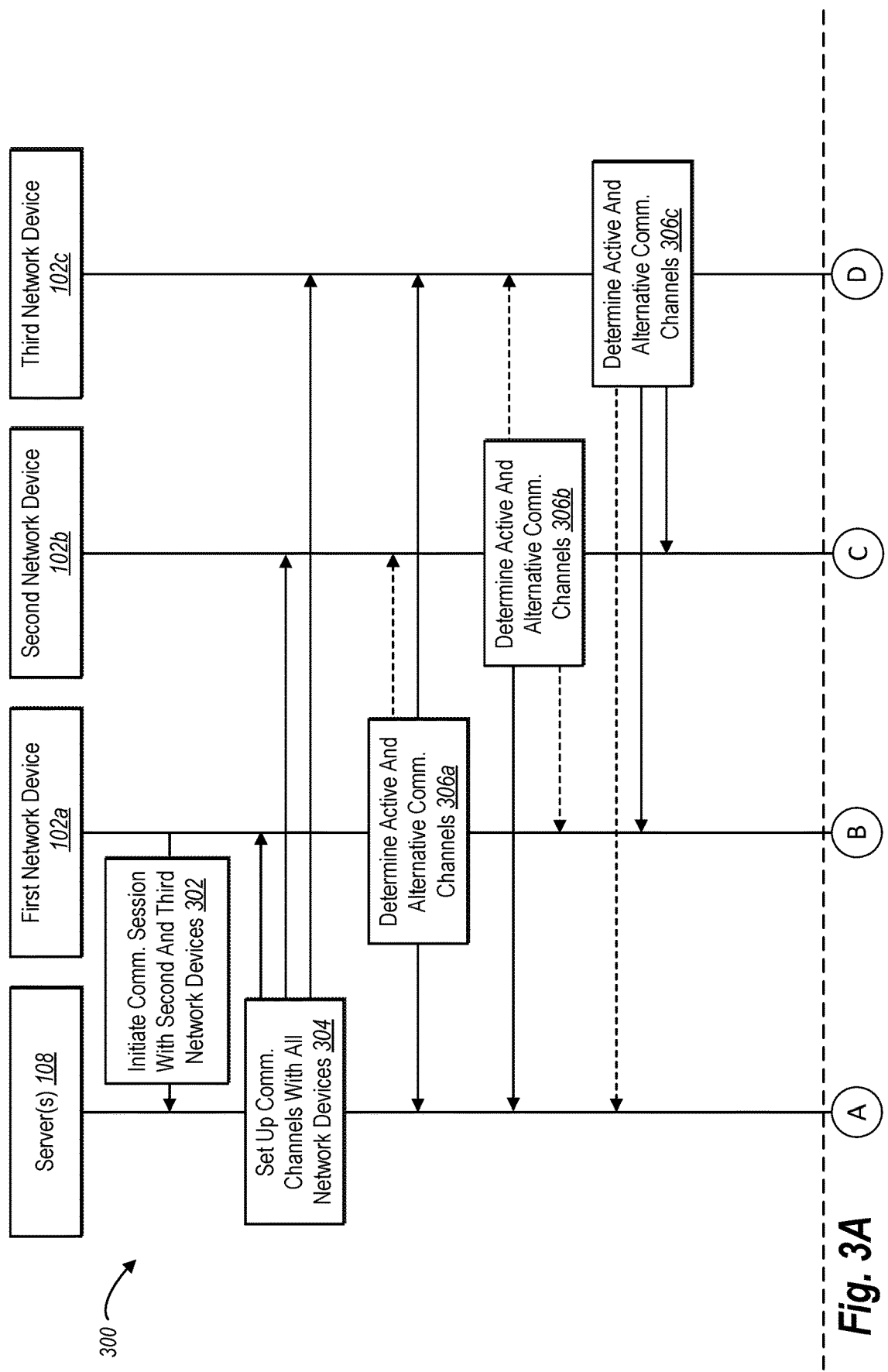
FIGS. 3A-3B illustrate an example sequence-flow diagram of establishing and maintaining a communication session in accordance with one or more embodiments disclosed herein.

In act 302 of FIG. 3A, the first network device 102a sends a request to the server 108 to initiate a communication session with the second network device 102b and the third network device 102c. For example, a first user using the first network device 102a may request to call users associated with the second network device 102b and the third network device 102c. The first network device 102a can receive the user request and send the request, or a portion of the request to the server 108.

In act 304 of FIG. 3A, the server 108 can assist with establishing the communication session between the first network device 102a, the second network device 102b, and the third network device 102c. As described above, in some embodiments, the first network device 102a may provide the user request to the server 108, and the server 108 can create a multi-device communication session between the network devices 102. For example, the system 100 can employ a WebRTC platform to establish and manage the communication session. For instance, the WebRTC platform can manage signaling between the network devices 102 and the server 108 to generate communication channels between each of the network devices 102. It is understood, based on the disclosure herein, that other RTC platforms and protocols may be used by the system 100.

In creating and setting up a communication session, the server 108 can communicate with each of the first network device 102a, the second network device 102b, and the third network device 102c to provide signaling that allows each of the network devices 102 to have two communication channels with each of the other network devices. For example, and as illustrated in FIG. 3A, the server 108 can provide signaling to the first client device 102a that results in the first client device 102a establishing a peer-to-peer communication channel with each of the second and third network devices 102b-c, and in addition, the server 108 provides signaling to the first client device that results in the first client device 102a establishing a relay communication channel with each of the second and third network devices 102b-c.

Once the server 108 has set up, or has assisted in setting up, the communication session, the first network device 102a, as illustrated in step 306a, determines active and inactive communication channels for each of the participating network devices. For example, and as illustrated in FIG. 3A, the first network device 102a determines to activate the relay communication channel with the second network device 102b while maintaining the peer-to-peer communication channel as an alternate channel. In one or more embodiments, the first network device 102a makes this determination by sending test data packets to the second network device 102b through the peer-to-peer communication channel and the relay communication channel. In response to the first network device 102a sending test data packets, the second network device sends receiver reports through the peer-to-peer communication channel and the relay communication channel. The first network device 102a aggregates metrics include in the receiver reports to determine the characteristics of the peer-to-peer communication channel and the relay communication channel (e.g., response time, packet loss, etc.). The first network device 102a compares the peer-to-peer communication channel characteristics and the relay communication channel characteristics to determine which communication channel to activate and which communication channel to maintain as an alternative channel.

As illustrated in FIG. 3A, the first network device determines to activate the relay communication channel with the second network device 102b by the relay communication channel through the server 108, as indicated by the solid arrow from act 306a to the server 108 and the dashed arrow from act 306a to the second network device 102b indicating the alternative peer-to-peer communication channel with the second network device 102b. Furthermore, in act 306a, the first network device 102a determines to activate the peer-to-peer communication channel with the third network device 102c, indicated by the solid arrow from act 306a to the third network device 102c. The first network device 102a also maintains an alternative relay communication channel with the third network device 102c through the server 108, although not specifically shown.

In act 306b of FIG. 3A, and following the same process discussed above, the second network device 102b determines to activate with both the first network device 102a and the third network device 102c through active relay communication channels. The second network device 102b also maintains alternative peer-to-peer channels that connect to the first network device 102a and the third network device 102c. In contrast to the second network device 102b, in act 306c of FIG. 3A, the third network device 102c determines to communicate with both the first network device 102a and the second network device 102b through active peer-to-peer communication channels. The third network device 102c also creates and maintains alternative relay communication channels with the first network device 102a and the second network device 102b.

Figure 3B:
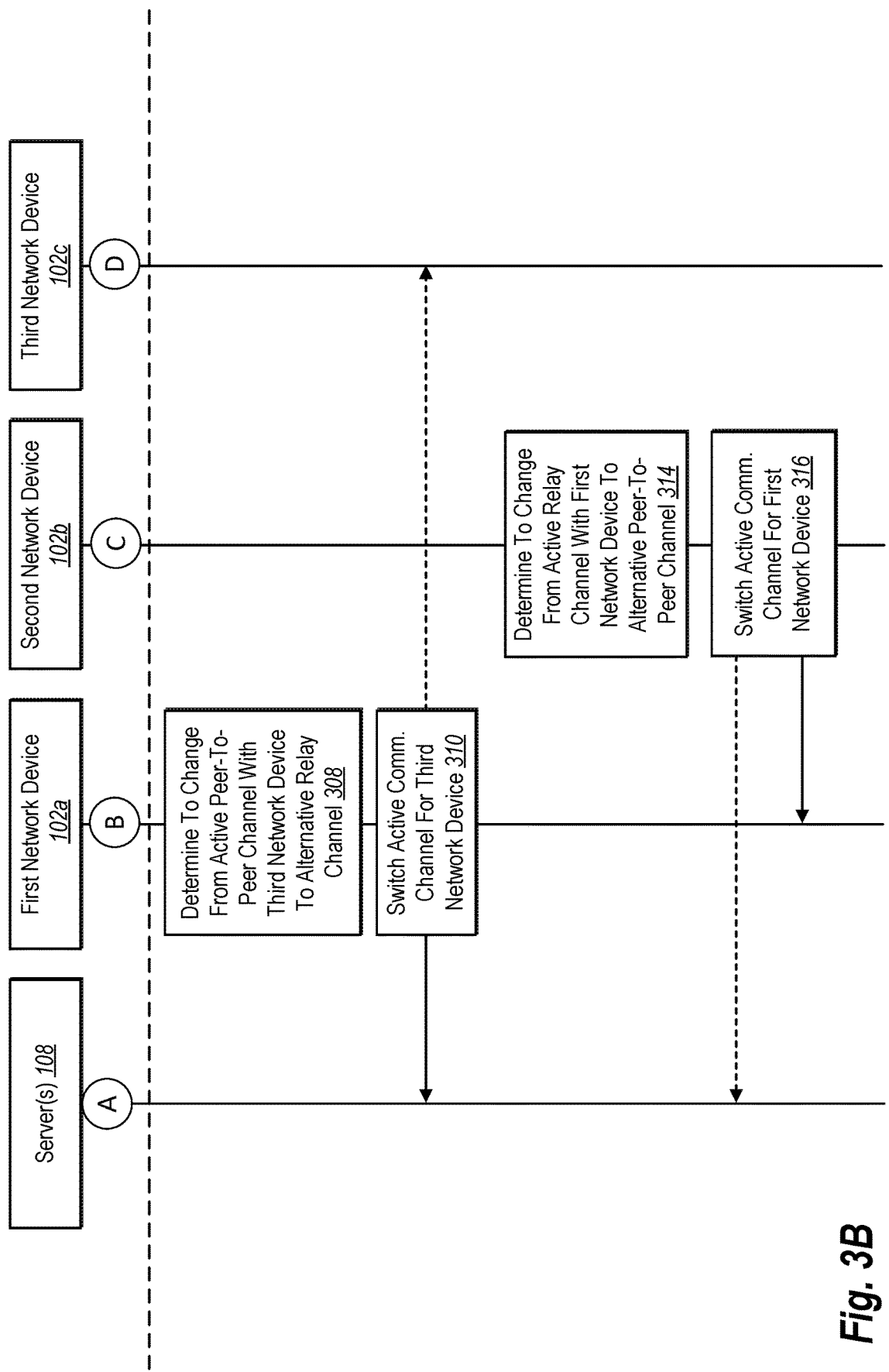

FIG. 3B illustrates the continuation of sequence-flow 300 illustrated in FIG. 3A. FIG. 3B shows the interactions between the server 108, the first network device 102a, the second network device 102b, and the third network device 102c when the first network device 102a determines to switch from sending a media stream to the third network device 102c through an active peer-to-peer communication channel to sending the media stream through the alternate relay communication channel.

In act 308 of FIG. 3B, for example, the first network device 102a determines to change from using the active peer-to-peer communication channel with the third network device 102c to using the alternative relay communication channel with the third network device. For instance, the first network device 102a can determine that the alternative relay communication channel is superior to the active peer-to-peer communication channel for a given status of a communication session. Additional details with respect to how the first device determines to change will be discussed in detail with regard to FIG. 4.

Upon determining to switch communication channels, and as illustrated in act 310 of FIG. 3B, the first network device 102a begins to send media streams to the third network device 102c by activating the relay communication channel. The first network device 102a also deactivates the peer-to-peer communication channel with the third network device 102c. Although the first network device 102a deactivates the peer-to-peer communication channel (e.g., ceases to send a media stream through the peer-to-peer communication channel), the first network device 102a maintains the peer-to-peer communication channel as the now alternate communication channel between the first network device 102a and the third network device 102c.

Independent from the first network device 102a determining to switch communication channels, the second network device 102b determines to switch from sending media streams through an active relay communication channel to an alternative peer-to-peer channel corresponding to the first network device 102a, as illustrated in act 314 and 316 of FIG. 3B. In particular, in act 314 of FIG. 3B, the second network device 102b determines to switch from sending media streams to the first network device 102a through the active relay communication channel to sending media streams through the alternative peer-to-peer communication channel. Then, in act 316 of FIG. 3B, the second network device 102b activates the peer-to-peer communication channel with the first network device 102a and deactivates the relay communication channel. As explained above, the now deactivated relay communication channel becomes the alternative communication channel and remains an available channel for the second network device 102b to use to send a media stream to the first network device 102a.

Figure 4:
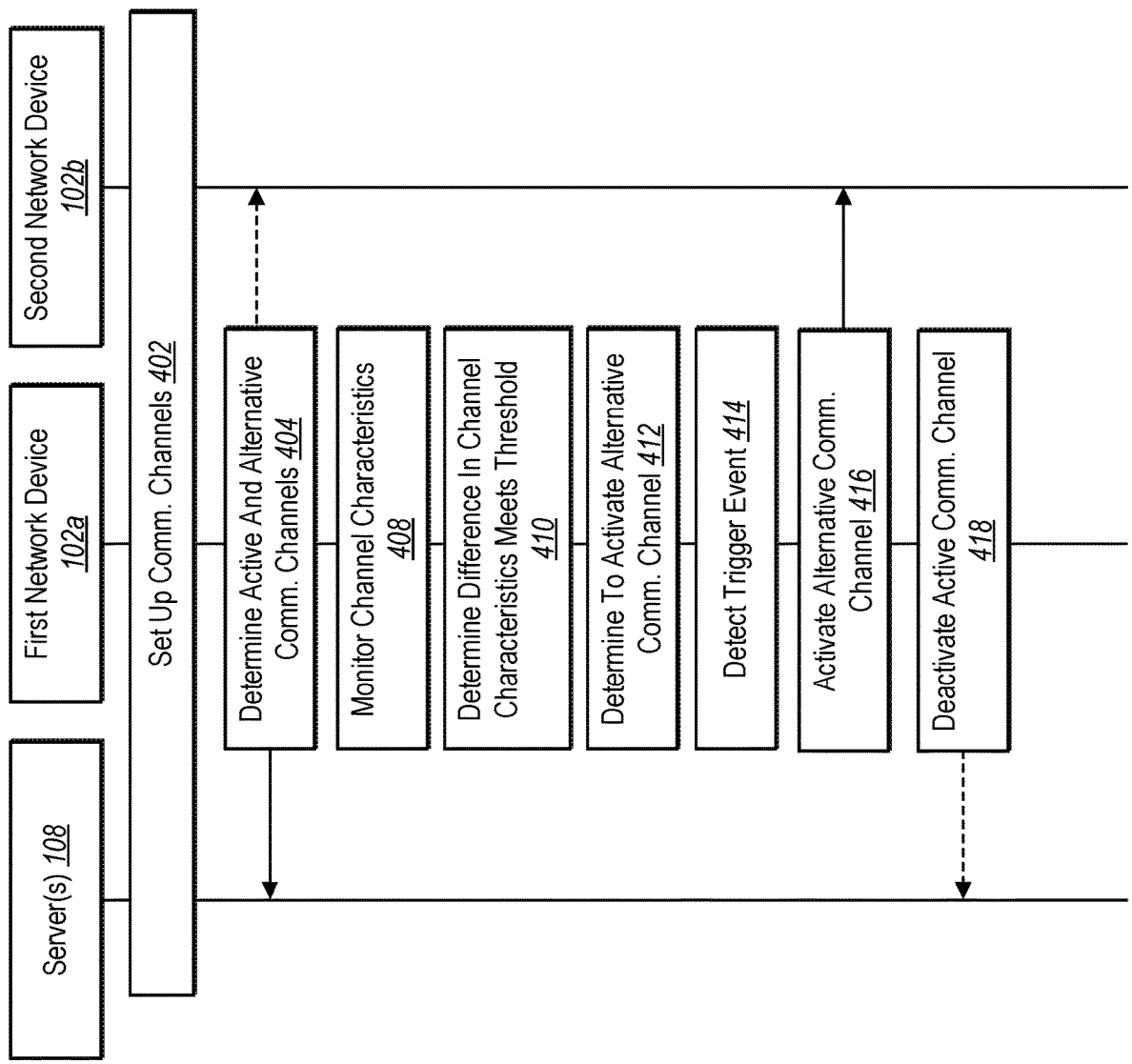
FIG. 4 illustrates an example sequence-flow diagram of establishing and maintaining a communication session in accordance with one or more embodiments disclosed herein.

FIG. 4 illustrates a sequence-flow 400 ("method 400") showing various acts and interactions of the server 108, the first network device 102a, and the second network device 102b during a communication session. For ease of explanation, FIG. 4 includes only two network devices and one server, however, one or more additional embodiments may include additional network devices and/or servers. In act 402 of FIG. 4, the server 108, first network device 102a, and the second network device 102b set up communication channels as previously described in acts 302 and 304 of FIG. 3A.

In step 404 of FIG. 4, the first network device 102a determines the active and alternative communication channels in a similar manner to the previously described act 306a of FIG. 3A. As illustrated in FIG. 4, the first network device 102a determines to activate the relay communication channel with the second network device 102b, shown by the solid arrow at act 404. Upon determining to activate the relay communication channel, the first network device 102a proceeds to provide a media steam to the server 108 and the server forwards the media stream to the second network device 102b.

Additionally, the first network device 102a maintains the alternative peer-to-peer communication channel with the second network device 102b, shown by the dashed arrow at act 404. In one or more embodiments, the first network device 102a maintains the alternative communication channel by periodically sending data traffic through the alternative peer-to-peer communication channel to the second network device 102b. In particular, the first network device 102b determines when to send maintenance data traffic to maintain the alternative communication channel. For example, the first network device can determine to send maintenance data traffic every 5 seconds, 10 seconds, 15 seconds or more.

In one or more embodiments, the maintenance data traffic includes data packets that allows the system to maintain the state of the alternative communication channel. For example, a communication channel may be associated with a firewall, network address translation device, or other network hardware or software components. In order for the alternative communication channel to remain available to send a media stream, the maintenance data traffic causes the state of the communication channel to be preserved even though the alternative communication channel is not currently being used to send a media stream. Thus, the maintenance data traffic preserves the initial channel negotiations and settings that are performed and created upon initially generating the communication channel.

In addition, in some embodiments, the maintenance data traffic allows the system to preserve encryption of the communication channel. For example, in some embodiments the communication channels are encrypted using an encryption algorithm that protects the contents of the data packets during the transmission over the communication channel. Once the data packets arrive at the second client device 102b, for example, the second client device 102b uses an encryption key to decrypt the data packets that allows access to the content of the data packets. In some cases, the encryption algorithm is associated with encryption keys that change over time. Thus, in order to keep the encryption associated with the communication channel current, the first network device 102a provides periodic maintenance data traffic that maintains a current encryption key for the communication channel. According, by maintaining synchronized encryption with the alternative communication channel, the first network device 102a can switch to providing a media stream through the alternative communication channel without having to renegotiate encryption. This allows for a seamless transition from one communication channel to another, or in other words, a user associated with the second network device 102a will not be able to notice any indication of the communication channel switch.

In addition to utilizing the active communication channel and maintaining the alternative communication channel, the first network device 102a also monitors channel characteristics for both the active and alternative communication channels. For example, in act 408 of FIG. 4, the first network device 102a monitors the channel characteristics of the active relay communication channel and alternative peer-to-peer communication channel with the second network device 102b. The first client device monitors channel characteristics by sending test data packets, receiving reports, analyzing received data, and/or otherwise accessing and analyzing data associated with each of the active and alternative communication channels.

In one or more embodiments, the network devices 102 monitor channel characteristics by sending test transmissions to other network devices 102 through the active communication channel and alternative communication channel to obtain and/or otherwise measure channel characteristics. For example, the first network device 102a sends test transmissions that include data packets to the second network device 102b, and in response, the second network device 102b sends receiver reports to the first network device 102a.

Using the test transmissions and receiver reports, the first network device 102a can determine channel characteristics for a particular communication channel, such as round-trip time, jitter, and packet loss data. Round-trip time is an indicator of the speed at which data is sent via a given communication channel. Jitter (e.g., packet jitter) is the variation in latency as measured in the variability over time of the packet latency across a communication channel which results in loss of audio data, or distorted video. Jitter can be measured in PVD (packet delay variation), which is a known quality of service characteristic. Packet loss is a measure of an amount of data packets lost during transmission which similarly results in data loss that leads to lost or distorted audio and/or video data. The first network device 102a can collect and analyze additional channel characteristics such as bit rate, throughput, transmission delay, availability, or other quality of service factors.

Upon obtaining various channel characteristics for a given communication channel, the first network device 102a can determine an overall quality and reliability of the given communication channel. For example, in one or more embodiments, the first client device 102a uses a weighted algorithm that combines the various communication channel metrics into an overall channel score. The weighted algorithm can prioritize characteristics that have a large effect on the quality of a communication session (e.g., round-trip time, packet loss), while still taking into account other channel characteristics that may influence the quality and reliability of the communication channel. Accordingly, the first network device 102a analyzes various channel characteristics to determine a channel score for a given channel. Because the first network device 102a continually monitors the channel characteristics for a given channel, the first network device 102a continually updates the channel score for the given channel.

In one or more embodiments, the network device then compares the channel characteristics of the active communication channel with the channel characteristics of the alternative communication channel. For example, as shown in FIG. 4, the first network device 102a can compare channel characteristics for the active relay communication channel with channel characteristics for the alternative peer-to-peer communication channel. In one or more embodiments, the first network device 102a compares a channel score for the active communication channel to a channel score for the alternative communication channel.

Based on the comparison of channel characteristics between the active and alternative communication channels, and as illustrated in step 410 of FIG. 4, the first network device 102a can determine that the alternative communication channel is superior in quality and reliability compared to the active communication channel. For instance, the first network device 102a can determine that the channel score for the alternative communication channel is higher than the channel score for the active communication channel. Based on this determination, the first network device 102a can determine to change to using the alternative communication channel.

In one or more embodiments, prior to the first network device 102a determining to change to the alternative communication channel, the first network device 102a verifies that the difference between the channel characteristics (e.g., the channel scores) meets a predefined threshold. In other words, if the difference between the active and alternative communication channels is minimal, even though the alternative communication channel has a higher channel score, the first network device 102a does not determine to change to the alternative communication channel. For example, switching communication channels can create minor delays equal to the differences in round trip times between the two channels.

In instances where an active channel's characteristics and an alternative channel's characteristics are comparable in quality, automatic switching might lead to unnecessary complications without gaining much if any benefit. Moreover, if the active and alternative communication channel have very similar channel scores, for example, over time the communication channel with the highest channel score may vary frequently (e.g., every two seconds or less). Thus, to limit the amount of unnecessary channel switching, the first network device 102a compares the differences in channel characteristics to a minimum threshold that acts as a buffer to avoid a repetitive and/or constant switching between two channels.

In one or more embodiments, the threshold is a difference between two channel scores that will result in a noticeably higher quality media stream presentation during a communication session. Moreover, the threshold may be variable based on the type of communication (e.g., audio versus video), number of participants, and/or type of network devices associated with a particular communication channel. Accordingly, in some embodiments, a threshold corresponding to active and alternative communication channels associated with one network device may be different than a threshold corresponding to active and alternative communication channels associated with another network device participating in the same communication session.

In addition to monitoring channel characteristics, a network device can monitor the status or characteristics of a communication session as a whole and use communication session characteristics as additional factors to determine whether or not to switch to an alternative communication channel. For example, a network device can consider the number of participants in a communication session, the geographic location of one or more participants, the time of day, the day of the week, and/or the type of communication session (e.g., an audio conference versus a video conference). Accordingly, network devices can determine to change to an alternative communication channel based on the communication session characteristics and/or channel characteristics.

In some embodiments, for example, the presence of additional participants would cause a network device to favor using communication channels having a relay communication mode in order to limit the number of media streams the network device needs to provide. For example, based on a particular network device's computing capacity, the network device may predefine a maximum number of video streams to provide. Alternatively, the network device may define a ratio between the number of participants and the number of media streams the network device is providing. In any event, network device monitors the number of participants and uses that number in determining which communication channels to activate.

Similarly, the network device can determine the geographic location of other participants and use the geographic location to maximize the efficiency of communication channel selection. For example, the network device can determine that several participants are located in a similar geographic region, and in response, the network device can determine to send a single media stream via a relay communication channel that uses a relay (e.g., server) proximate to the geographic area of the participants. In contrast, the network device may determine that a distance between the participant's geographic location and a relay is greater than the distance between the participant's geographic location and the network device. In such a scenario, the network device may favor a peer-to-peer communication channel over a relay communication channel, all channel characteristics otherwise being equal. Similarly, the network device may determine a total trip transmission trip distance based on determining a participant's geographic location.

Along similar lines, the network device can account for the time of day and/or day of week to assist in determining which communication channel or which communication mode to use. For example, the network device can access historical network traffic history that indicates high network traffic times (e.g., a slower network) versus lower network traffic times (e.g., a faster network). If a communication session is occurring during a high network traffic time, the network device may favor communication channels having a relay communication mode in order to limit the number of media streams to provide through a network at the high traffic time, all other channel characteristics being the same. On the other hand, the network device may favor peer-to-peer communication channels during lower network traffic periods, all other channel characteristics being the same.

In addition to monitoring communication session characteristics to assist in determining active and alternative communication channels, the network device can also receive a manual user request to change communication channels. For example, the network device can provide a graphical user interface that includes a selectable element (e.g., button) that allows a user to specify which communication channel to use. In some embodiments, for example, the selectable element is in the form of a privacy communication channel option. For example, a peer-to-peer communication channel is more secure than a relay communication channel in that the peer-to-peer does not depend on a server to forward the media stream. Accordingly, a user can select a privacy mode, which in turn causes the network device to either maintain an active peer-to-peer channel or activate an alternative peer-to-peer channel.

Along similar lines, some conferencing features are only available when using a relay communication channel. For example, if a user wishes to record a video conference, relay media streams are needed to allow the relay servers to record the video conference. Accordingly, if a user selects to record a communication session, the network device can either maintain an active relay communication channel or activate an alternative relay communication channel to allow the system 100 to record the communication session. Therefore, in addition to monitoring various channel and communication session characteristics, the network device can determine to change communication channels based on user input.

Based on the various characteristics and factors discussed above, the first network device 102a can determine to activate the alternative communication channel with the second network device 102b, as illustrated in act 412 in FIG. 4. In some embodiments, once the determination is made, the first network device 102a immediately proceeds to send the media stream through the alternate communication channel. However, in other embodiments, the first network device 102a delays executing the change in communication channel until detecting a trigger event.

For example, and as shown in FIG. 4, the first network device 102a will wait to change communication channels until detecting a trigger event 414. Waiting for a trigger event is advantageous because switching communication channels may cause a slight defect or delay in the transmission of media stream. Accordingly, the first network device 102a can wait for a trigger event that indicates a point in the communication session in which any negative effects from changing communication channels will be minimized. Accordingly, as used herein, a "trigger event" means a detectable state that causes a network device to switch from an active communication channel to an alternative communication channel. Examples of detecting a trigger event may include detecting whether the user is speaking, detecting a pause in speech, detecting a defined difference between channel scores of the active communication channel and the alternative communication channel, or other detectable events.

For instance, the first network device 102a may determine to activate the alternative peer-to-peer communication channel with the second network device 102b, and based on that determination, the first network device determines whether or not it detects a trigger event. If a trigger event is detected, then the first network device proceeds to activate the alternative communication channel, as illustrated in act 416 of FIG. 4. If the first network device 102a does not detect a trigger event, the first network device 102a waits to activate the alternative communication channel until the first network device 102a detects a trigger event. To illustrate, after determining to switch communication channels, the first network device 102a can detect whether or not a user is actively speaking. Detecting that the user is not actively speaking is a trigger event that causes the first network device 102a to proceed to activate the alternative communication channel. On the other hand, if the user is actively speaking, the first network device 102a waits to detect a pause in speech where the pause is the trigger event that causes the first network device to proceed to activate the alternative communication channel.

As mentioned above, in some embodiments the trigger event is a defined difference in channel scores between the active and alternative communication channel. In other words, in some cases the quality difference between the active and alternative communication channels is so great (e.g., the active communication channel quality is poor) that it would be better and less noticeable for the first network device 102a to switch channels immediately notwithstanding other factors such as if the user is actively speaking. Accordingly, an example trigger event includes detecting a defined difference in quality between the active and alternative communication channels.

In addition to activating the alternative communication channel, the first network device 102a deactivates the peer-to-peer communication channel with the second network device 102b by ceasing to provide the media stream through that channel, as illustrated in act 418 of FIG. 4. The first network device 102a then maintains the deactivated relay communication channel as an alternative communication channel, as discussed above.

Figure 5:
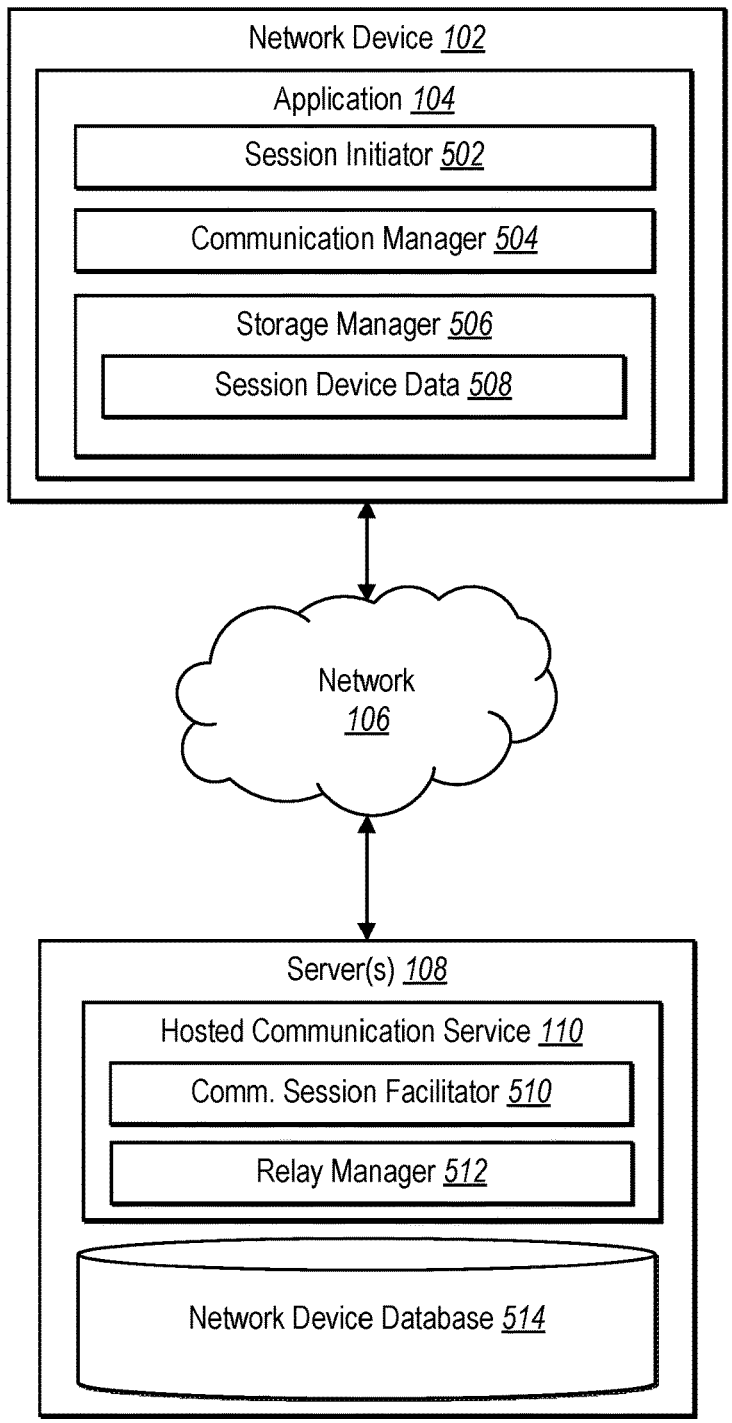
FIG. 5 illustrates a schematic diagram of an example a network-based communication system in accordance with one or more embodiments disclosed herein.

FIG. 5 illustrates an exemplary network-based communication system 500 (hereinafter "system 500") according to principles described herein. The system 500 may be one example configuration of the system 100 described in connection with FIGS. 1-4. As illustrated, the system 500 includes the network device 102 connected to the server 108 via the network 106. The network device 102 includes application 104 that includes a session initiator 502, a communication manager 504, and a storage manager 506 that stores session device data 508.

In general, the session initiator 502 facilitates the establishment of a communication session between users, such as a multi-device communication session. For example, the session initiator 502 may initiate audio, video, instant messages, unified, and other types of communication sessions between one or more users associated with network devices. The session initiator 502 may employ protocol, such as SIP or WebRTC, in facilitating communication sessions. Further, the session initiator 502 can facilitate multi-device communication session between the first network device 102a and two or more other network devices.

In one or more embodiments, the session initiator 502 can receive a request to initiate a multi-device communication session. For example, a user may indicate a desire to communicate with other users in a conference call via the network device 102. The request from the user can include identification information for other users with whom the user desires to communicate, which the session initiator 502 can use to establish the multi-device communication session.

In one or more embodiments, the session initiator 502 can communicate with the session facilitator 510 on the server 108 to set up a multi-device communication session. For example, the session initiator 502 can obtain contact information from the session facilitator 510 on the server 108, such as phone numbers or address information, used to contact the other devices. Alternatively, as described in greater detail below, the session initiator 502 can send the user request, or a portion of the user request to the session facilitator 510 on the server 108 and the session facilitator 510 can set up a multi-device communication session. In one or more embodiments, the session initiator 502 can facilitate the addition or removal of network device in a multi-device communication session. For example, a first network device 102a and a second network device 102b can be in a communication session, when a third network device 102c requests to join the communication session. The session initiator 502 can connect the three network devices and can establish a multi-device communication session between the three network devices.

As mentioned above, the communication manager 504 monitors communication as well as sends and receives media streams. In particular, the communication manager 504 can send media streams to other network devices with which the network device is communicating. For example, if the network device 102 is participating in a multi-device communication session, the communication manager 504 can send a media stream to the other network devices in the multi-device communication session.

The communication manager 504 can also receive media streams from other network devices. For example, the communication manager 504 can receive one or more media streams from each network device with which the network device 102 is in a multi-device communication session. For instance, if a user associated with the network device is part of a conference call with five other users, the communication manager 504 can receive five media streams corresponding to the five other users. Alternatively, the communication manager 504 can receive media streams from one or more network devices through the server 108.

In one or more embodiments, the communication manager 504 can monitor communication channels with the other network devices during a multi-device communication session. For example, the communication manager 504 can monitor the connection quality and status of communication channels and determine to switch from active to alternative communication channels as described above.

In some example embodiments, the communication manager 504 can save information corresponding to each network device participating in a multi-device communication session. For example, the communication manager 504 can store session device data 508 in a storage manager 506. Session device data 508 can include connection information for each network device in the multi-device communication session, such as the address of each network device as well as an identifier corresponding to each network device. As such, if the first network device 102a does become temporarily disconnected from one or more network devices in a multi-device communication session, the communication manager 504 can use the session device data 508 to reconnect to each network device. The communication manager 504 can also use the session device data 508 to verify the identity of a network device that was temporarily disconnected from a multi-device communication session with the first network device 102a.

As further illustrated in FIG. 5, the server 108 includes the hosted communication service 110 that includes a communication session facilitator 510 and a relay manager 512. In addition, the server 108 can include a network device database 514 that stores device data needed to connect devices in communication sessions. As discussed above, the communication session facilitator 510 can assist in establishing and maintaining a communication session between network devices. In addition, the relay manager 512 manages the transmittal of media streams through active relay communication channels based on a network device providing a media stream through the relay communication channel. In other words, upon receiving a media stream from a first network device, the relay manager 512 forwards the media stream to one or more other network devices based on instructions from the network device sending the media stream.

Figure 6:
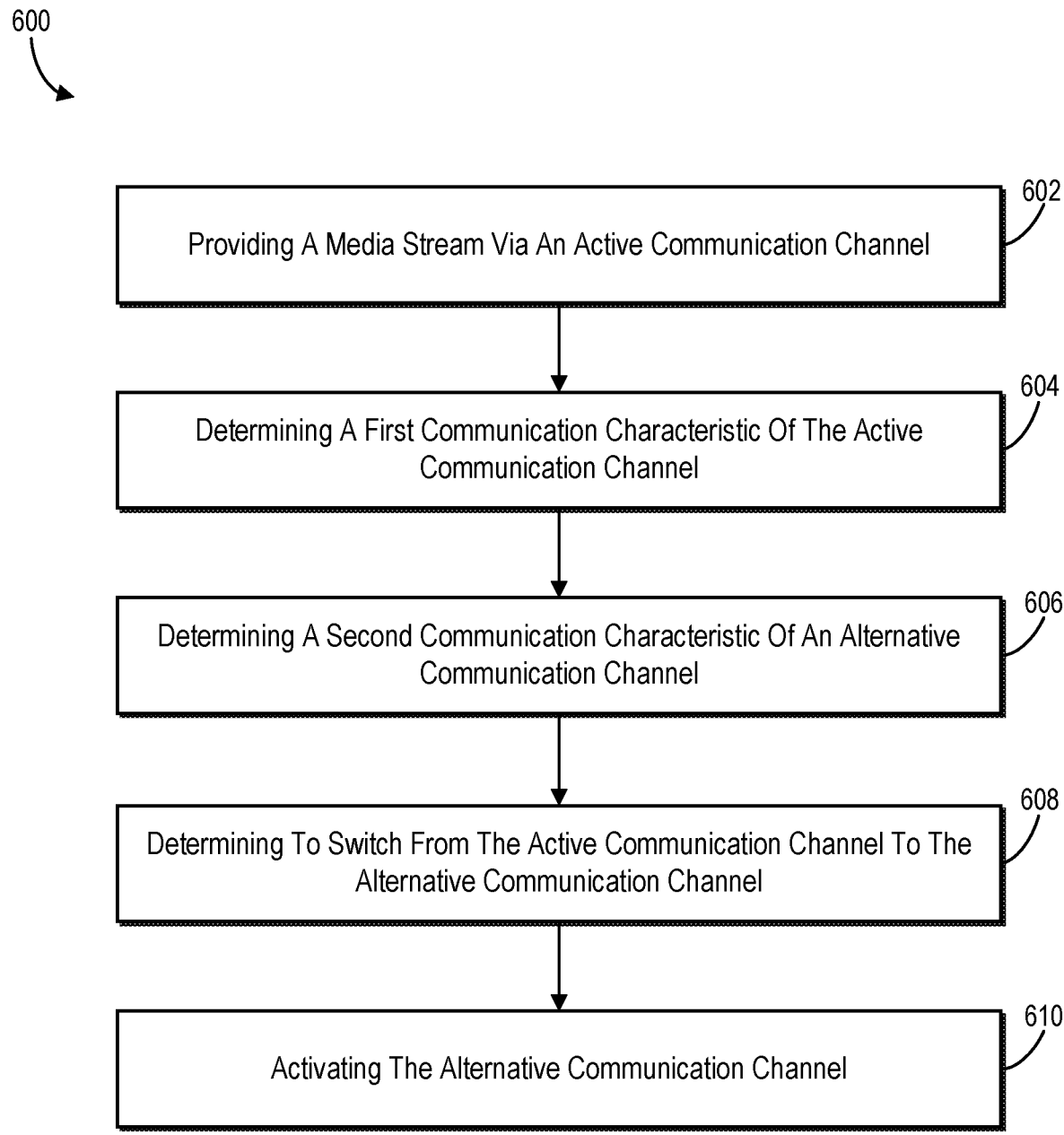
FIG. 6 illustrates an example flowchart of a series of acts for providing a multi-device communication session in accordance with one or more embodiments disclosed herein.

FIGS. 1-5, the corresponding text, and the examples, provide a number of different systems and devices for providing a network-based communication system. In addition to the foregoing, embodiments also can be described in terms of flowcharts comprising acts and steps in a method for accomplishing a particular result. Turning now to FIG. 6, this figure illustrates a flowchart of a series of acts 600 of providing a communication session in accordance with one or more embodiments described herein. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions, that when executed by one or more processors, cause a computing device to perform the acts of FIG. 6. In still further embodiments, a system can perform the acts of FIG. 6.

As shown in FIG. 6, the series of acts 600 can include act 602 of providing a media stream via an active communication channel. In particular, act 602 can include providing, by a first network device and to a second network device participating in a communication session, a media steam via an active communication channel between the first network device and the second network device. In addition, the series of acts 600 can include act 604 of determining a first communication characteristic of the active communication channel, as illustrated in FIG. 6. For example, act 604 can include determining, by the first network device, a first communication characteristic for an active communication channel between the first network device and a second network device within the hosted conference, wherein the active communication channel is associated with a first communication mode.

Moreover, the series of acts 600 shown in FIG. 6 can include act 606 of determining a second communication characteristic of an alternative communication channel. For instance, act 606 includes determining, by the first network device, a second communication characteristic for an alternative communication channel between the first network device and the second network device, wherein the alternative communication channel is associated with a second communication mode.

Furthermore, the series of acts 600 can include act 608 of determining to switch from the active communication channel to the alternative communication channel. For example, act 608 includes determining, by the first network device, to switch from the active communication channel associated with the first communication mode to the alternative communication channel associated with the second communication mode based on the first communication characteristic and the second communication characteristic.

In addition, the series of acts 600 can include act 610 of activating the alternative communication channel, as shown in FIG. 6. For instance, act 610 includes activating, by the first network device, the alternative communication channel to provide the media stream to the second network device via the alternative communication channel associated with the second communication mode.

Figure 7:
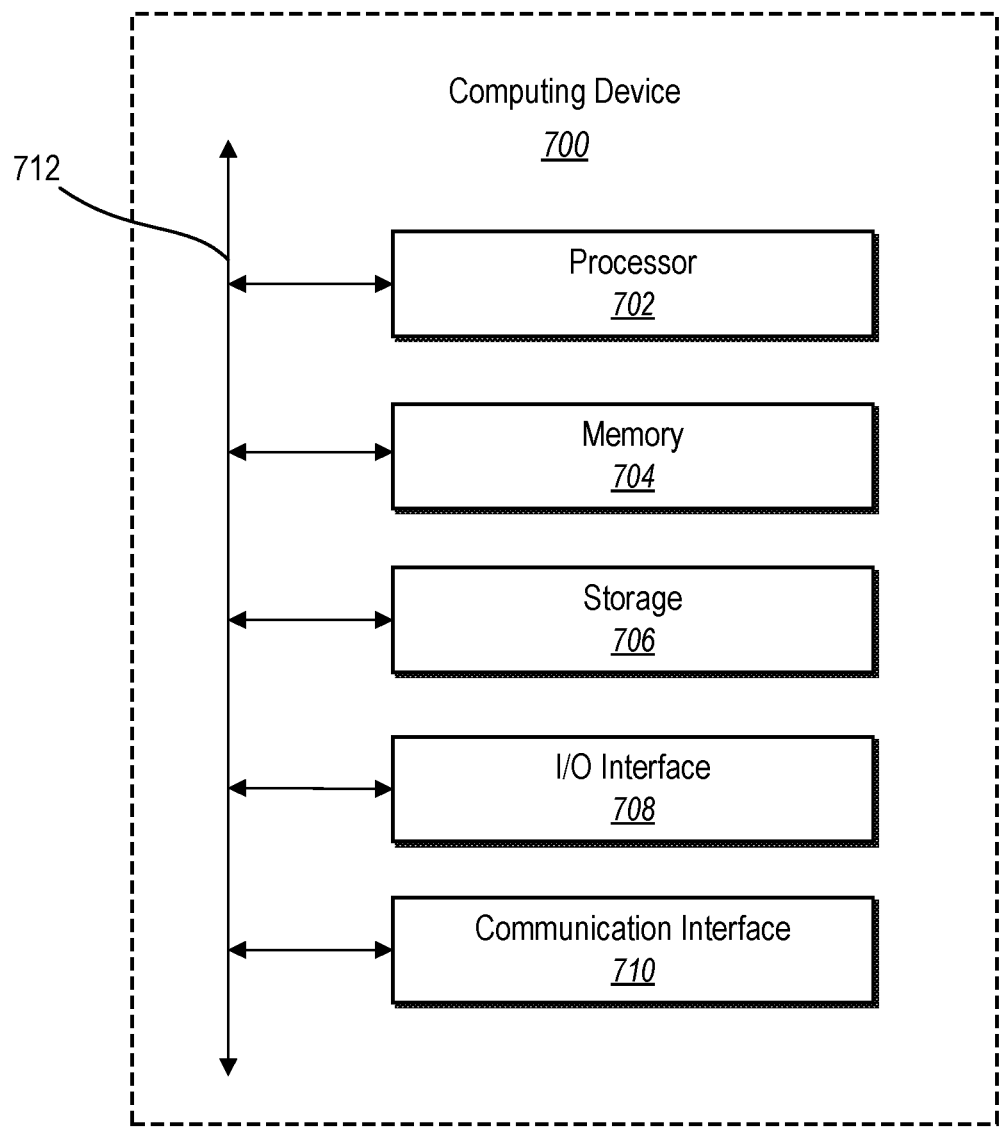
FIG. 7 illustrates a block diagram of an example computing device in accordance with one or more embodiments disclosed herein.

FIG. 7 illustrates, in block diagram form, an exemplary computing device 700 that may be configured to perform one or more of the processes described above. One will appreciate that system 100, and/or VoIP system 200 each comprises one or more computing devices in accordance with implementations of computing device 700. As shown by FIG. 7, the computing device can comprise a processor 702, a memory 704, a storage device 706, an I/O interface 708, and a communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example, to execute instructions processor 702 may retrieve (or fetch) the instructions from an internal register, an internal cache, memory 704, or storage device 706 and decode and execute them. In particular embodiments, processor 702 may include one or more internal caches for data, instructions, or addresses. As an example, processor 702 may include one or more instruction caches, one or more data caches, and one or more translation lookaside buffers ("TLBs"). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as random access memory ("RAM"), read only memory ("ROM"), a solid-state disk ("SSD"), flash, phase change memory ("PCM"), or other types of data storage. Memory 704 may be internal or distributed memory.

Storage device 706 includes storage for storing data or instructions. As an example, storage device 706 can comprise a non-transitory storage medium described above. Storage device 706 may include a hard disk drive ("HDD"), a floppy disk drive, flash memory, an optical disc, a magneto-optical disc, magnetic tape, or a universal serial bus ("USB") drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In other embodiments, Storage device 706 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example, communication interface 710 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 710 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 710 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communications signals between a network device 102 and one or more servers 108.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communications devices, transmission control protocol ("TCP"), internet protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MMS"), radio frequency ("RF") signaling technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, an InfiniBand bus, or another suitable bus or a combination thereof.

Figure 8:
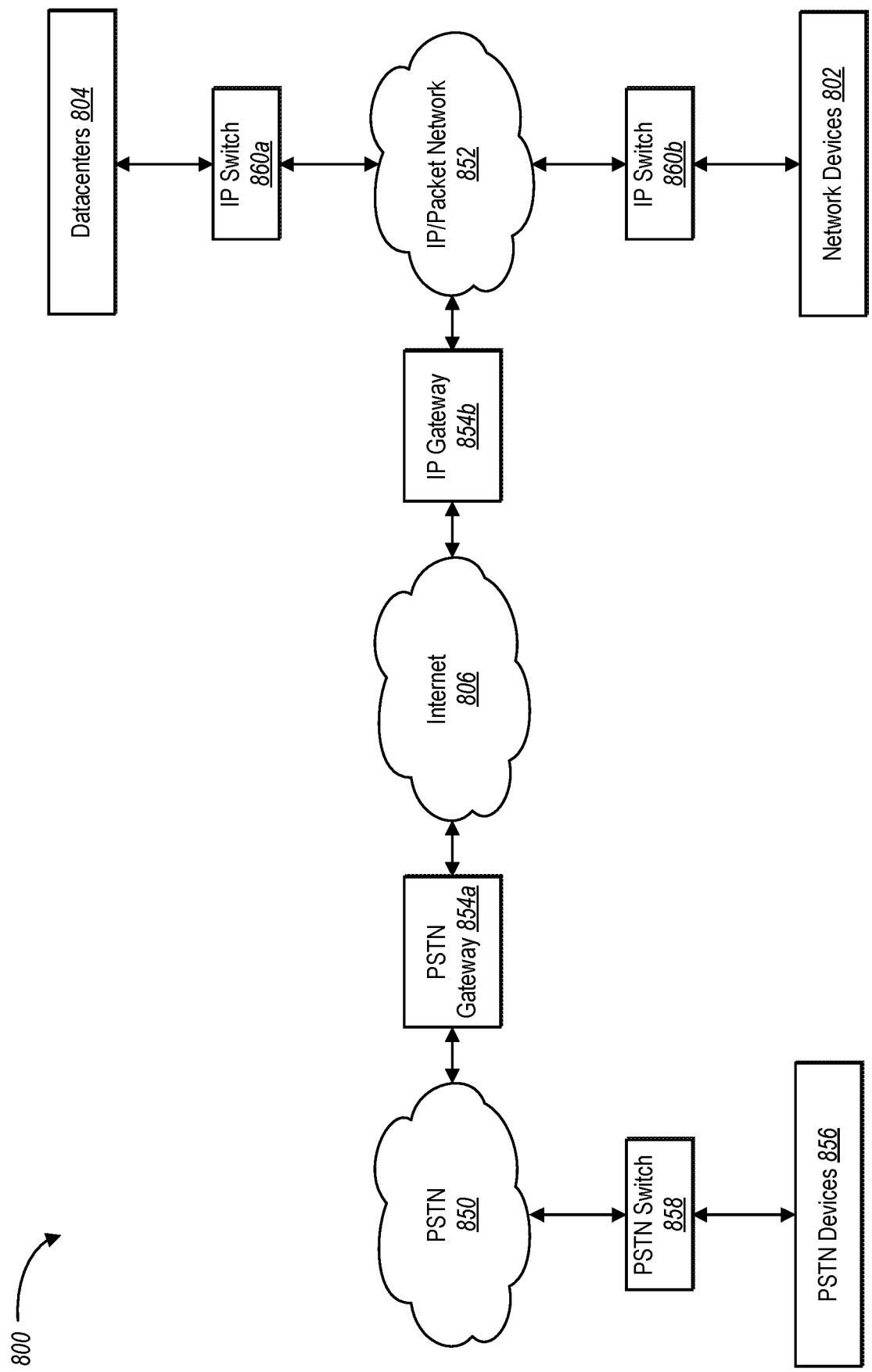
FIG. 8 illustrates an example network environment of a network-based communication system in accordance with one or more embodiments disclosed herein.

FIG. 8 illustrates an example network environment of a telecommunications system 1100 according to the principles described herein. In particular, the telecommunications system 800 may facilitate both network-based communication systems as well as circuited-switched traditional communication systems. For example, the telecommunications system 800 may allow a user calling from a traditional landline to converse with a user using a VoIP device. In addition, while FIG. 8 illustrates exemplary components and devices according to one embodiment, other embodiments may omit, add to, reorder, and/or modify any of the components and devices shown in FIG. 8.

The telecommunication system 800 may include a PSTN 850 and an IP/packet network 850. The PSTN 850 and the IP/packet network 852 may be connected via a network, such as the Internet 806, intranet, or over a private network. In some configurations, the PSTN 850 and/or the IP/packet network 852 may be connected to the Internet 806 via a PSTN gateways 854a or an IP gateway 854b. For example, gateway 854b may be a signaling gateway and/or a media gateway. For instance, the signaling gateway processes and translates bidirectional SIP signals, and the media gateway handles real-time transport protocol communications. In addition, network trunks may interconnect the PSTN 850, the Internet 806, and the IP/packet network 850.

The PSTN 850 may connect to one or more PSTN devices 856. For example, a PSTN switch 858 may connect the one or more PSTN devices 856 to the PSTN 850. PSTN devices 856 may include a variety of devices ranging from traditional landline devices to mobile/cellular devices. In some embodiments, the PSTN can connect to a network-based communication system via a datacenter.

The PSTN 850 may include, but is not limited to telephone lines, fiber optic cables, microwave transmission links, cellular networks, communications satellites, and undersea telephone cables. Switching centers may interconnect each of this components and networks. Further, the PSTN 850 may be analog or digital. In addition, the PSTN 850 may use protocols such as common channel signaling system 7 ("CCS7"). CCS7 is a set of protocols used in the PSTN 850 to setup and tear down communications between subscribers (i.e., users).

As illustrated in FIG. 8, the telecommunications system 800 may include an IP/packet network 852. The IP/packet network 852 may be part of a network-based system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 852 provides communications services between users over the Internet 806 rather than using a traditional PSTN 850. However, VoIP systems also allow users to communicate with users using PSTN 850. Thus, a subscriber using a network device 802 may communicate with a subscriber using a PSTN device 856. Furthermore, VoIP systems allow users to communicate with each other without accessing the PSTN 850.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 8, the IP/packet network 852 may also include network devices 802 devices and servers 804. The network devices 802 devices and servers 804 illustrated in FIG. 8 may be exemplary configurations of the network device 102 and servers 108 described above. For example, example of network devices 802 include a variety of devices, such as personal computers, a tablet computer, handheld devices, mobile phones, smartphones, personal digital assistants ("PDA"), in- or out-of-car navigation systems, and other electronic access devices. In addition, the network device 802 may be part of an enterprise environment, such as a professional business exchange ("PBX"), a small office/home office environment, or a home/personal environment.

As briefly described above, network devices 802 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Server 804 may facilitate communications between network devices 802. For example, server 804 registers devices, stores device identification and address information, tracks current communications, and logs past communications, etc., as described above. In addition, servers 804 also assists network devices in provisioning, signaling, and establishing user communications via a media bridge.

In the case of multiple servers 804, one server 804 may communicate with another server 804. For example, one server 804 may send gathered network device 802 information to the other server 804. In particular, when a server 804 registers a network device 802, that server 804 may send the address information to the other servers 804 located on the IP/packet network 852. Accordingly, each server 804 may communicate with other datacenters 1104 and assist the IP/packet network 1152 in balancing network and processing loads. Further, the servers 804 may assist the IP/packet network 852 to ensure that communication sessions between network devices 802 do not fail by communicating with each other.

As illustrated, the network devices 802 and the servers 804 may be connected to the IP/packet network 852 via IP switches 860*a-b*. IP switches 860*a-b* manage the flow of data across the IP/packet network 852 by transmitting a received message to the device for which the message was intended. In some configurations, the IP switches 860*a-b* may also perform router functions. Further, while not illustrated, one or more modems may be in electronic communication with the IP switches 860*a-b*.

In addition, the IP/packet network 852 may facilitate session control and signaling protocols to control the signaling, set-up, and teardown of communication sessions. In particular, the IP/packet network 852 may employ SIP signaling. For example, the IP/packet network 852 may include a SIP server that processes and directs signaling between the network devices 802 and the IP/packet network 852. Other protocols may also be employed. For example, the IP/packet network 852 may adhere to protocols found in the H.225, H.323, and/or H.245 standards, as published by the International Telecommunications Union, available at the following URL—http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 802, the BYE method terminates the communication session.

Once signaling is established, the IP/packet network 852 may establish a media bridge. The media bridge caries the payload data for a communication session. The media bridge is separate for the device signaling. For example, in a videoconference, the media bride includes audio and video data for a communication session.

As described above a server 804 may facilitate a media bridge path for a network device 802. For example, when one network device 802 attempts the contact a second network device 802, the server 804 may execute the signaling and also determine a media bridge between the two network devices 802. Further, the server 804 may provide alternative media bridge paths to the network devices 802 in the event that the primary media bridge weakens, for example, below a threshold level, or even fails.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments disclosed herein.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

providing, by a first network device and to a second network device participating in a communication session, a media stream via an active communication channel between the first network device and the second network device;

receiving, by the first network device and via the active communication channel between the first network device and the second network device within the communication session, active channel receiver reports, wherein the active communication channel is associated with a first communication mode;

determining, by the first network device, a first communication characteristic by analyzing the active channel receiver reports;

receiving, by the first network device, and via an alternative communication channel between the first network device and the second network device, alternative channel receiver reports, wherein the alternative communication channel is associated with a second communication mode, wherein receiving the alternative channel receiver reports comprises:

sending, by the first network device and via the alternative communication channel, test data packets to the second network device; and receiving, at the first network device, the alternative channel receiver reports from the second network device based on the second network device generating the alternative channel receiver reports in response to receiving the test data packets;

determining, by the first network device, a second communication characteristic by analyzing the alternative channel receiver reports;

determining, by the first network device, to switch from the active communication channel associated with the first communication mode to the alternative communication channel associated with the second communication mode based on the first communication characteristic and the second communication characteristic, wherein one of the second communication mode or the first communication mode comprises a relay communication mode utilizing a forwarding unit; and activating, during the communication session and by the first network device, the alternative communication channel to provide the media stream to the second network device via the alternative communication channel associated with the second communication mode.

2. The method of claim 1, wherein:
the first communication mode comprises a peer-to-peer communication mode between the first network device and the second network device; and
the second communication mode comprises the relay communication mode between the first network device and the second network device.

3. The method of claim 1, further comprising maintaining the alternative communication channel by sending periodic maintenance data traffic through the alternative communication channel to the second network device.

4. The method of claim 3, wherein the periodic maintenance data traffic preserves an encrypted state of the alternative communication channel.

5. The method of claim 1, wherein determining to switch from the active communication channel to the alternative communication channel based on the first communication characteristic and the second communication characteristic comprises:
comparing the first communication characteristic to the second communication characteristic; and
determining that the alternative communication channel is superior to the active communication channel based on comparing the first communication characteristic to the second communication characteristic.

6. The method of claim 1, further comprising:
generating a channel score for the active communication channel based at least in part on the first communication characteristic; and
generating a channel score for the alternative communication channel based at least in part on the second communication characteristic.

7. The method of claim 6, wherein determining to switch from the active communication channel to the alternative communication channel based on the first communication characteristic and the second communication characteristic comprises determining the channel score for the active communication channel is less than the channel score for the alternative communication channel.

8. The method of claim 6, further comprising:
identifying a difference between the channel score for the active communication channel and the channel score for the alternative communication channel; and
determining whether the difference between the channel score for the active communication channel and the channel score for the alternative communication channel meets a predefined threshold, wherein determining to switch from the active communication channel to the alternative communication channel is based on the difference meeting the predefined threshold.

9. The method of claim 1,
deactivating the active communication channel between the first network device and the second network device; and
maintaining availability of the deactivated communication channel between the first network device and the second network device by sending periodic maintenance data traffic through the deactivated communication channel.

10. The method of claim 1, further comprising:
detecting a trigger event subsequent to determining to switch from the active communication channel to the alternative communication channel; and
wherein activating the alternative communication channel to provide the media stream to the second network device via the alternative communication channel associated with the second communication mode is in response to detecting the trigger event.

11. A system comprising:
at least one processor; and
at least one non-transitory computer-readable storage medium storing instructions there on that, when executed by the at least one processor, cause the system to:
provide, from a first network device and to a second network device participating in a communication session, a media stream via an active communication channel between the first network device and the second network device;
receive, by the first network device and via an active communication channel between the first network device and the second network device within the communication session, active channel receiver reports, wherein the active communication channel is associated with a first communication mode;
determine, by the first network device, a first communication characteristic by analyzing the active channel receiver reports;
receive, by the first network device, and via an alternative communication channel between the first network device and the second network device, alternative channel receiver reports, wherein the alternative communication channel is associated with a second communication mode, wherein receiving the alternative channel receiver reports comprises:
sending, by the first network device and via the alternative communication channel, test data packets to the second network device; and
receiving, at the first network device, the alternative channel receiver reports from the second network device based on the second network device generating the alternative channel receiver reports in response to receiving the test data packets;
determine, by the first network device, a second communication characteristic by analyzing the alternative channel receiver reports;
determine, by the first network device, to switch from the active communication channel associated with the first communication mode to the alternative communication channel associated with the second communication mode based on the first communication characteristic and the second communication characteristic, wherein one of the second communication mode or the first communication mode comprises a relay communication mode utilizing a forwarding unit; and
activate, during the communication session and by the first network device, the alternative communication channel to provide the media stream to the second network device via the alternative communication channel associated with the second communication mode.

12. The system of claim 11, further comprising instructions that, when executed by the at least one processor, cause the system to maintain the alternative communication channel by sending periodic maintenance data traffic through the alternative communication channel to the second network device.

13. The system of claim 12, wherein the periodic maintenance data traffic preserves an encrypted state of the alternative communication channel.

14. The system of claim 11, further comprising instructions that, when executed by the at least one processor, cause the system to:
- compare the first communication characteristic to the second communication characteristic; and
- determine that the alternative communication channel is superior to the active communication channel based on comparing the first communication characteristic to the second communication characteristic, wherein determining to switch from the active communication channel to the alternative communication channel is based on the determination that the alternative communication channel is superior to the active communication channel.

15. The system of claim 11, further comprising instructions that, when executed by the at least one processor, cause the system to:
- generate a channel score for the active communication channel based at least in part on the first communication characteristic; and
- generate a channel score for the alternative communication channel based at least in part on the second communication characteristic.

16. The system of claim 15, wherein determining to switch from the active communication channel to the alternative communication channel based on the first communication characteristic and the second communication characteristic comprises determining the channel score for the active communication channel is less than the channel score for the alternative communication channel.

17. A non-transitory computer readable storage medium comprising instructions that, when executed by at least one processor, cause a computer device to:
- provide, from a first network device and to a second network device participating in a communication session, a media stream via an active communication channel between the first network device and the second network device;
- receive, by the first network device and via an active communication channel between the first network device and the second network device within the communication session, active channel receiver reports, wherein the active communication channel is associated with a first communication mode;
- determine, by the first network device, a first communication characteristic by analyzing the active channel receiver reports;
- receive, by the first network device, and via an alternative communication channel between the first network device and the second network device, alternative channel receiver reports, wherein the alternative communication channel is associated with a second communication mode, wherein receiving the alternative channel receiver reports comprises:
  - sending, by the first network device and via the alternative communication channel, test data packets to the second network device; and
  - receiving, at the first network device, the alternative channel receiver reports from the second network device based on the second network device generating the alternative channel receiver reports in response to receiving the test data packets;
- determine, by the first network device, a second communication characteristic by analyzing the alternative channel receiver reports;
- determine, by the first network device, to switch from the active communication channel associated with the first communication mode to the alternative communication channel associated with the second communication mode based on the first communication characteristic and the second communication characteristic, wherein one of the second communication mode or the first communication mode comprises a relay communication mode utilizing a forwarding unit; and
- activate, during the communication session and by the first network device, the alternative communication channel to provide the media stream to the second network device via the alternative communication channel associated with the second communication mode.

18. The non-transitory computer readable storage medium of claim 17, further comprising instructions that, when executed by the at least one processor, cause the computer device to:
- generate a channel score for the active communication channel based at least in part on the first communication characteristic; and
- generate a channel score for the alternative communication channel based at least in part on the second communication characteristic.

19. The non-transitory computer readable storage medium of claim 18, further comprising instructions that, when executed by the at least one processor, cause the computer device to:
- identify a difference between the channel score for the active communication channel and the channel score for the alternative communication channel; and
- determine whether the difference between the channel score for the active communication channel and the channel score for the alternative communication channel meets a predefined threshold, wherein determining to switch from the active communication channel to the alternative communication channel is based on the difference meeting the predefined threshold.

20. The non-transitory computer readable storage medium of claim 17, further comprising instructions that, when executed by the at least one processor, cause the computer device to detect a trigger event subsequent to determining to switch from the active communication channel to the alternative communication channel; and wherein activating the alternative communication channel to provide the media stream to the second network device via the alternative communication channel associated with the second communication mode is in response to detecting the trigger event.

* * * * *